United States Patent [19]

Ast et al.

[11] Patent Number: 5,412,414
[45] Date of Patent: May 2, 1995

[54] SELF MONITORING/CALIBRATING PHASED ARRAY RADAR AND AN INTERCHANGEABLE, ADJUSTABLE TRANSMIT/RECEIVE SUB-ASSEMBLY

[75] Inventors: Harry C. Ast, Camillus; Albert H. Berical, Liverpool; Blake A. Carnahan, Cazenovia; James W. Krueger, Jr.; Donald P. Miller, both of Liverpool; John D. Reale, Syracuse, all of N.Y.

[73] Assignee: Martin Marietta Corporation, Syracuse, N.Y.

[21] Appl. No.: 179,546

[22] Filed: Apr. 8, 1988

[51] Int. Cl.⁶ ............................................. G01S 7/40
[52] U.S. Cl. ...................................... 342/174; 342/372
[58] Field of Search ............... 342/174, 173, 165, 368, 342/371, 372, 373, 374, 375, 376, 377

[56] References Cited

U.S. PATENT DOCUMENTS

| | | | |
|---|---|---|---|
| 4,823,136 | 4/1989 | Nathanson et al. | 342/368 |
| 4,864,315 | 9/1989 | Mohuchy | 342/173 X |
| 4,884,078 | 11/1989 | Fishkin et al. | 342/360 |
| 4,924,234 | 5/1990 | Thompson | 342/369 |
| 4,952,940 | 8/1990 | Kuepfer | 342/174 |
| 5,027,127 | 6/1991 | Shnitkin et al. | 342/372 |
| 5,262,787 | 11/1993 | Wilson et al. | 342/173 |

*Primary Examiner*—John B. Sotomayor
*Attorney, Agent, or Firm*—Paul Checkovich; Stephen A. Young

[57] ABSTRACT

The invention relates to a self monitoring/calibrating phased array radar in which the operating path for transmission and the operating path for reception may be monitored/calibrated by the addition of a corporate calibration network coupled at the plural end to the antenna elements and at the singular end to the exciter/receiver, and switching means to selectively route the monitoring/calibrating signal derived from the exciter in a transmit path to calibration path sequence or in a calibration path to receive path sequence.

In one embodiment of the invention, a phase shifter common to transmit and receive paths is adjustable in increments under active logical control for calibration, while power and gain performance is monitored but not actively controlled. A novel T/R sub-assembly houses the operating electronics for four antenna elements in the form of four T/R modules with a one to four divider network in the transmit/receive path and in the calibration path. The four antenna elements are an integral part of the T/R sub-assembly.

24 Claims, 13 Drawing Sheets

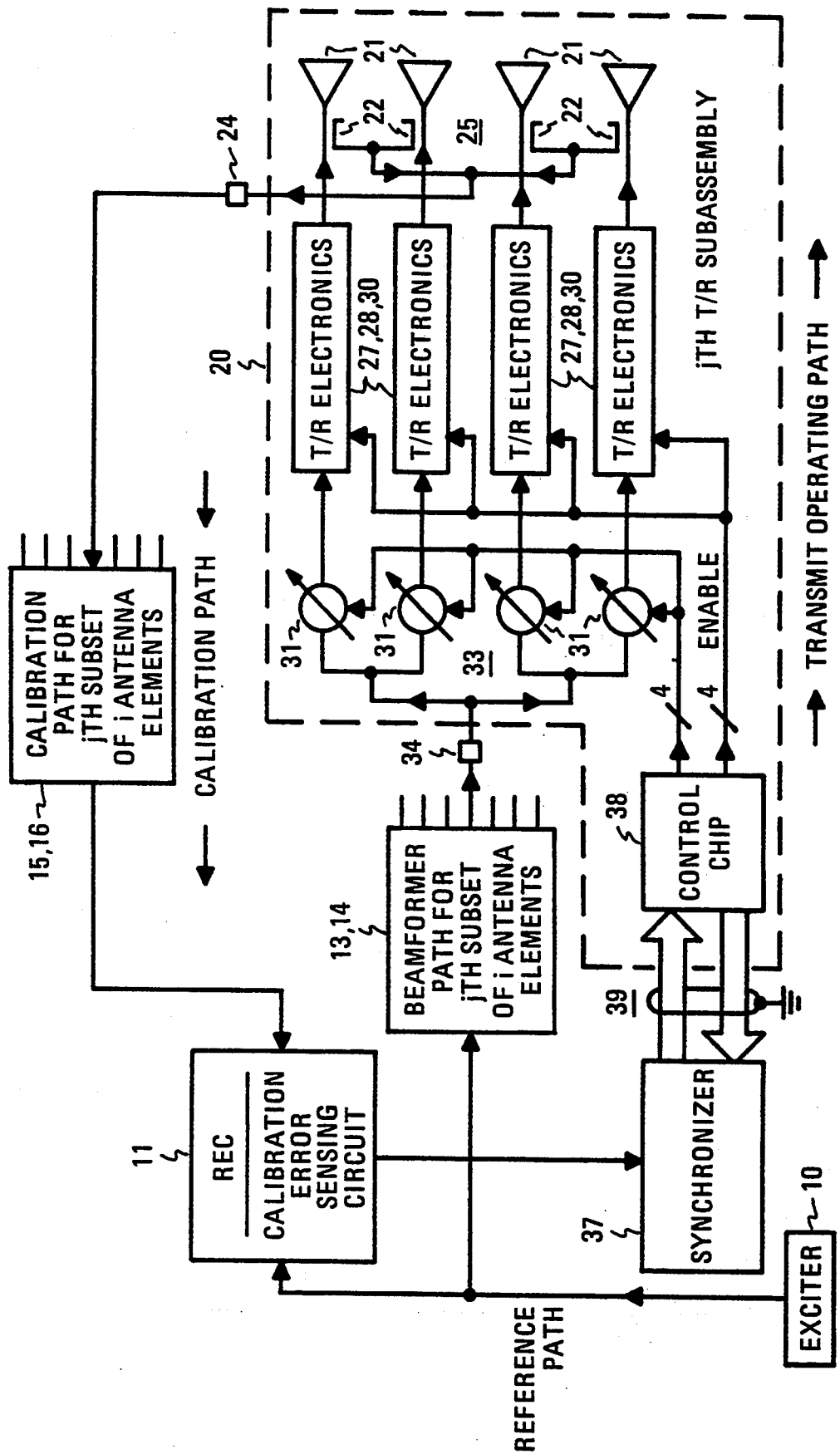
FIG. 2A TRANSMIT PATH CALIBRATION LOOPS FOR jTH SUBSET OF i ANTENNA ELEMENTS

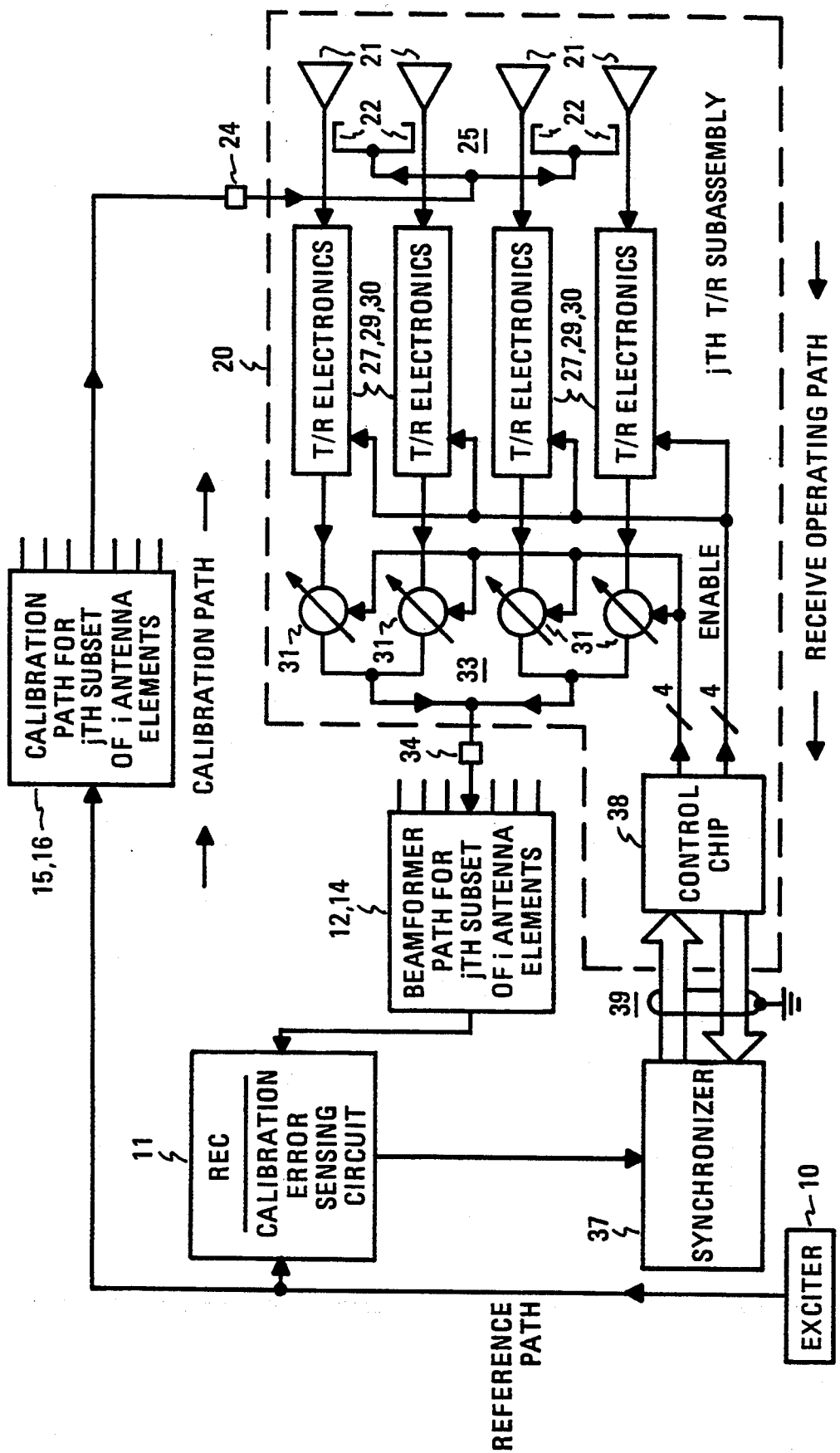
FIG. 2B RECEIVE PATH CALIBRATION LOOPS FOR jTH SUBSET OF i ANTENNA ELEMENTS

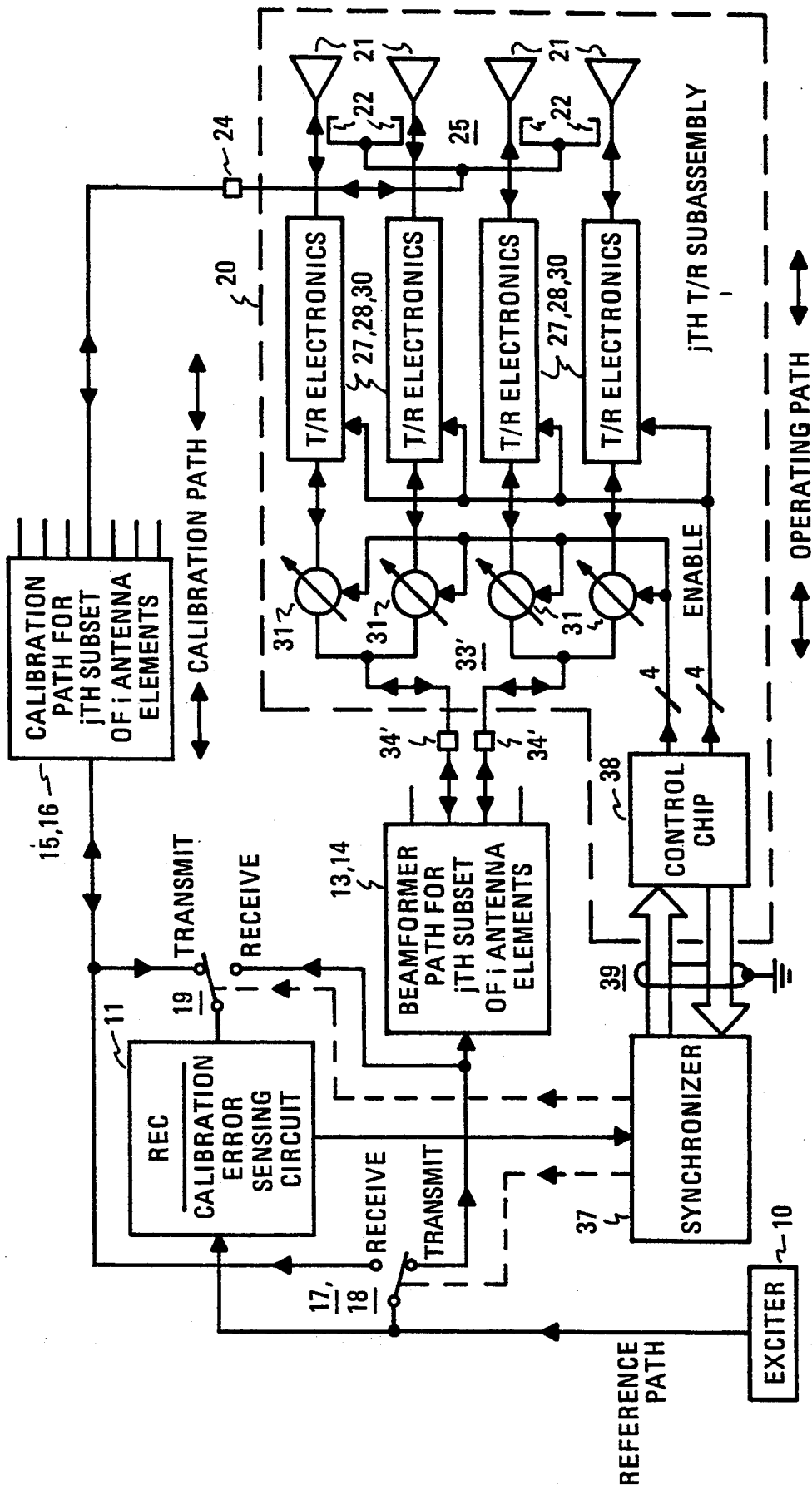
FIG. 3A OPERATING PATH CALIBRATION LOOPS FOR jTH SUBSET OF i ANTENNA ELEMENTS

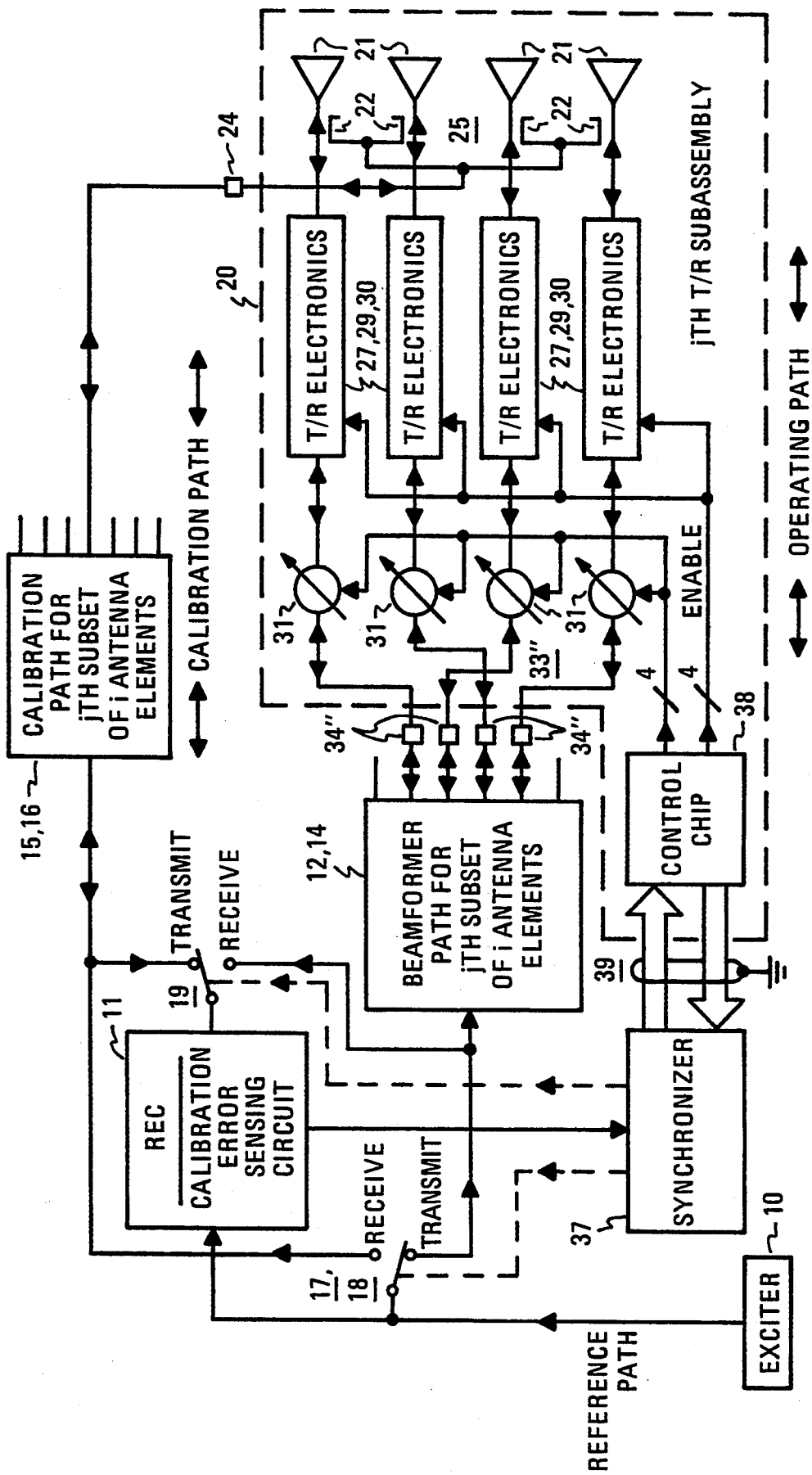
FIG. 3B OPERATING PATH CALIBRATION LOOPS FOR jTH SUBSET OF i ANTENNA ELEMENTS

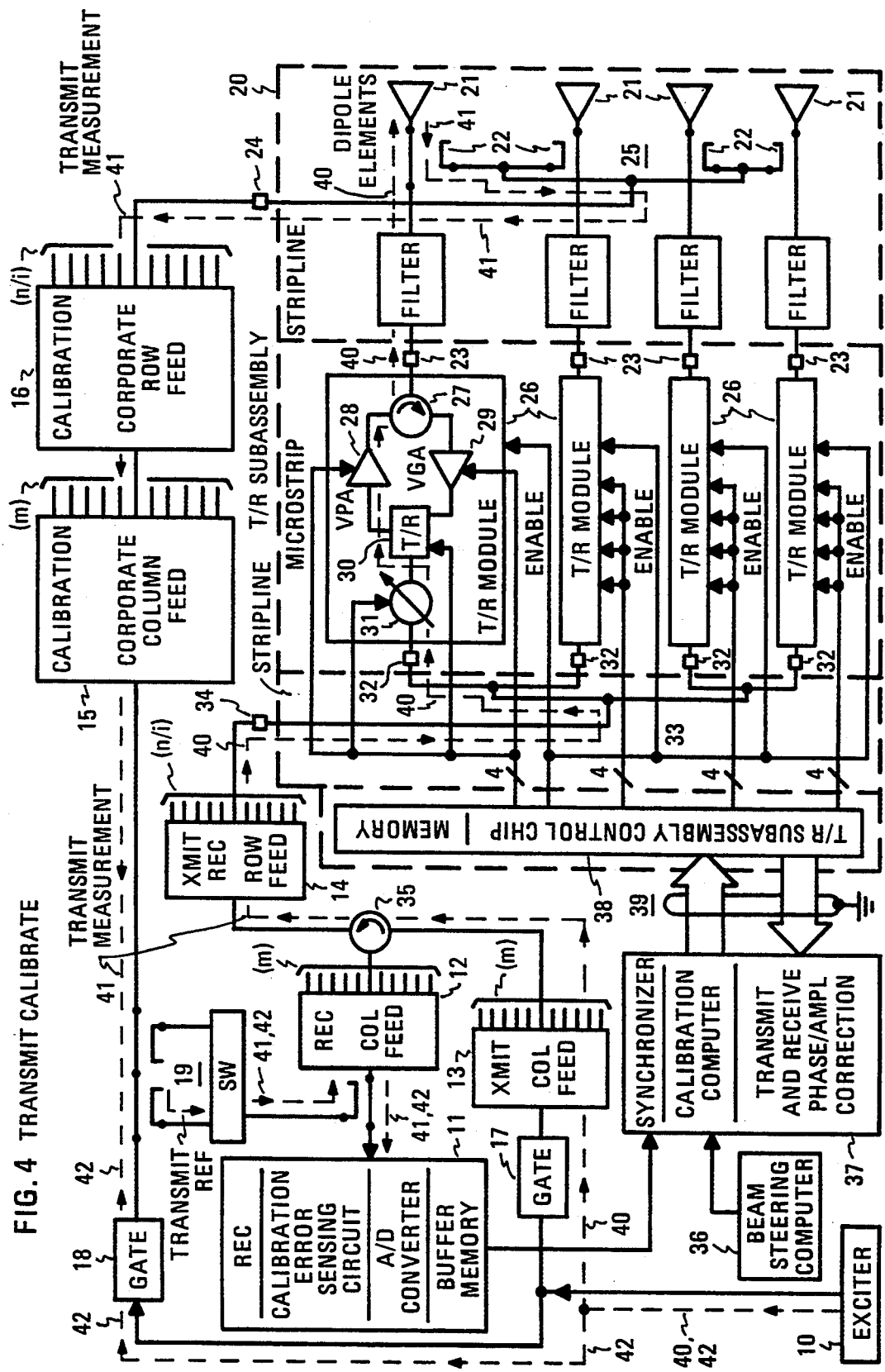
FIG. 4 TRANSMIT CALIBRATE

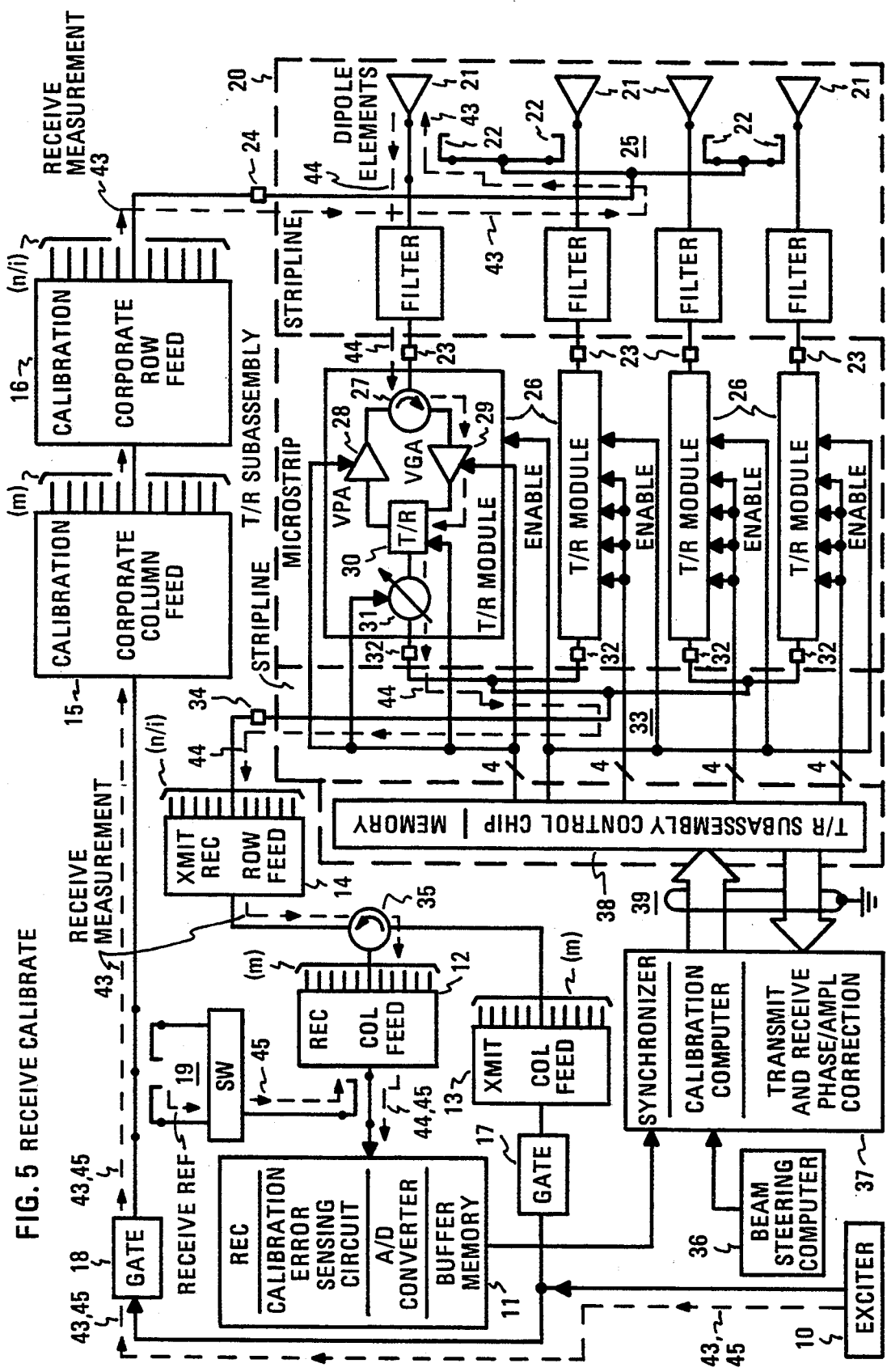

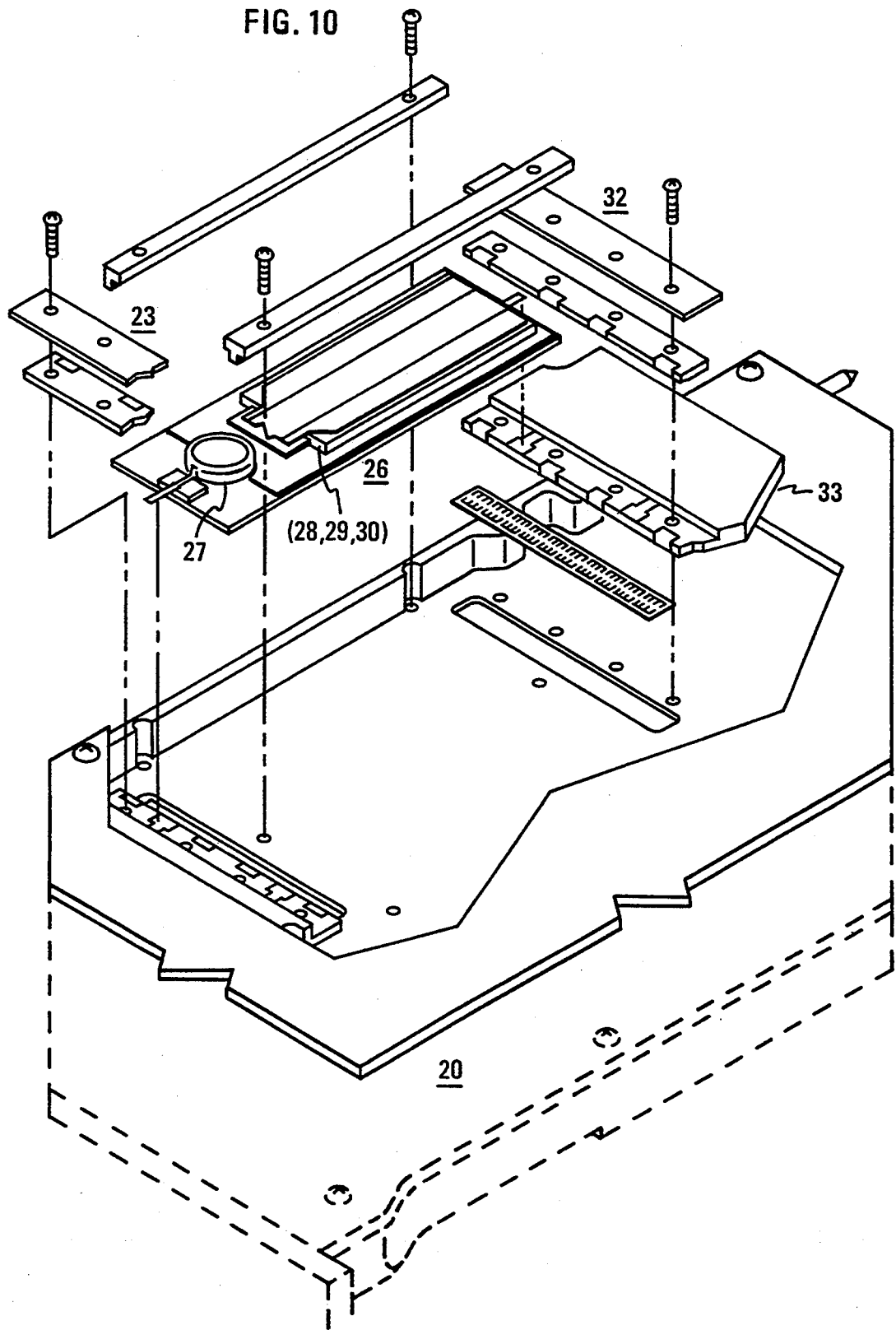

SELF MONITORING/CALIBRATING PHASED ARRAY RADAR AND AN INTERCHANGEABLE, ADJUSTABLE TRANSMIT/RECEIVE SUB-ASSEMBLY

BACKGROUND OF THE INVENTION

1. Field of the Invention

The invention relates to the calibration and maintenance within calibration of the critical performance parameters of the individual transmit/receive operating circuits of each antenna element of a phased array radar and to a novel adjustable and interchangeable transmit/receive sub-assembly providing the operating circuits for specific antenna elements, by means of which a self monitoring/calibration process may be carried out.

2. Prior Art

In a conventional phased array radar system, power generation is accomplished through the use of a power tube or amplifier and then distributed to the individual radiating elements through a transmission line network. Care must be taken to insure that all individual transmission line paths are of the same or known line length to accomplish beamsteering and control over the desired frequency bandwidths. Line length calibration in service is usually not necessary.

In a solid state radar, a low power exciter usually generates the carrier of the transmitted signal. The exciter output is often modulated in amplitude or phase, including pulsing, to generate radar signals of low power. These low power signals are then distributed to an array of power amplifying modules each arranged to drive an antenna element of the phased array.

During transmission, it is essential that the power amplifiers in the modules retain phase coherence between themselves in order for the antenna pattern to be as specified. For some applications "weighting" of the power amplifier is used to reduce side lobes. The power level of the power amplifiers is also important for system performance for both weighted and unweighted transmission.

During reception, similar constraints are placed on the receiver function. In a phased array radar system, each antenna element is provided with a low noise amplifier. For the received "beam" to be properly formed, particularly for monopulse operation, where both sum and difference beams are formed, each low noise amplifier associated with each antenna element should process the signal with the same phase response and amplify it to the same degree.

In a customary phased array radar system, the need to meet a specific power gain or phase requirement applies to each of the several thousand operating circuits, each circuit associated with an element of the array. Accordingly, any correction must be efficient for large numbers of potential errors.

Radars operating at frequencies above 3 Gigahertz require a "high frequency" bulk material for their active devices, favoring use of a "MMIC" format. At these frequencies, active devices using silicon bulk materials become significantly less efficient than devices using higher frequency bulk materials such as Gallium Arsenide. At the same time, the actual sizes of the features of both active and passive components decreases, making it practical to integrate both the active and passive components on a single monolithic circuit. This circuit format is called the "Monolithic Microwave Integrated Circuit" (MMIC).

The MMIC format capitalizes on the semi-insulating quality of GaAs bulk material which permits efficient passive devices and circuit runs in layouts which are of controlled dimension using a photolithographic approach. The result is a very compact circuit construction.

Active devices in the MMIC format may be reproduced by a photolithographic process, and using certain new techniques they may be used to achieve adjustable gain in finely stepped increments. For instance, in the case of low noise amplifiers, stepped gain, and in the case of phase shifters, stepped phase.

An underlying fact in MMIC construction is that the effects of fabricational errors on circuit values are often greater than the circuit design can tolerate. For example, error in phase response may be substantially random in certain MMICs. Gain, however, is more predictable although still excessively variable for some applications. Thus, assuming an unacceptable error in a critical property due to manufacturing—or due to aging—the incremental property of MMICs suggests a way to achieve more exact circuit values in the operating circuits.

SUMMARY OF THE INVENTION

Accordingly, it is an object of the invention to provide an improved phased array radar apparatus.

It is another object of the invention to provide a phased array radar apparatus having improved means for monitoring/calibrating the operating paths between the individual antenna elements and the receiver/exciter.

It is still another object of the invention to provide an improved transmit/receive (T/R) sub-assembly providing the operating circuits for a set of antenna elements for use in a phased array radar apparatus.

It is a further object of the invention to provide an improved T/R sub-assembly for use in a self monitoring/calibrating phased array radar apparatus.

It is an object of the invention to provide a novel gain adjustable T/R sub-assembly for use in a self calibrating phased array radar apparatus.

It is another object of the invention to provide a novel phase adjustable T/R sub-assembly for use in a self calibrating phased array radar apparatus.

It is still another object of the invention to provide a novel T/R sub-assembly of adjustable phase and/or gain and/or power for use in a self monitoring/calibrating phased array radar apparatus.

It is an additional object of the invention to provide a novel T/R sub-assembly which may be used interchangeably with like T/R sub-assemblies in a phased array radar apparatus.

It is another object of the invention to provide an improved self monitoring/calibrating phased array radar apparatus for applications above 1 Gigahertz.

These and other objects of the invention are achieved in a novel combination for maintaining an accurate phase response in the transmit path from the exciter to each antenna element and in the receive path from each antenna element to the receiver in an m column × n row element phased array radar apparatus.

The combination includes an exciter which provides a signal for calibration and transmission, a receiver including a phase error sensing circuit referenced to the exciter and a measurement port, and a beamformer. The beamformer provides m×n/j plural ports, where j in the usual case is 1, 2, or 4, disposed in the transmit/receive operating paths from exciter/receiver to antenna elements.

The combination further includes a corporate calibration feed network providing a singular port internally coupled to (m×n/i) plural ports where i in the usual case is 4, each path being of known electrical length to provide a calibrating path from each antenna element to the exciter/receiver, and an (m×n/4) fold plurality of phase adjustable transmit/receive (T/R) sub-assemblies, each disposed in the transmit/receive operating paths for each subset of 4 antenna elements.

Each T/R sub-assembly includes a divider network and transition with 1, 2 or 4 stripline ports connected to the beamformer and 4 microstrip ports, and 4 T/R modules using microstrip transmission paths, each module containing the active electronics for processing the signals of an associated antenna element.

More specifically, each module includes a bidirectional controllable phase shifter disposed in a transmit/receive operating path having a control for setting the phase, a power amplifier for amplifying the exciter signal, a low noise amplifier for amplifying signals from the associated antenna element, and a pair of three port transmit/receive branching means for routing signals from the exciter via the power amplifier to an associated antenna element during transmission and for routing signals from the antenna via the low noise amplifier to the receiver during reception, the pair comprising a T/R switch and a circulator.

The sub-assembly further includes 4 microstrip to stripline transitions coupling the circulator branching means to a stripline antenna circuit. The antenna circuit comprises 4 adjacent antenna elements in a row, each having a directional calibration coupler, and a four to one corporate feed network connecting the four antenna elements via calibration couplers to the calibration network. Thus the 4 transmit/receive operating paths are serially connected with a single calibrating path.

The calibration loop is completed for transmit operating path calibration by switching the exciter output into a measurement path consisting initially of the transmit operating path, secondly a calibrating path, and ending at the receiver measurement port.

The order is reversed for receive operating path calibration. Here the exciter output is switched into a measurement path consisting initially of a calibrating path, secondly a receive operating path, and ending at the receiver measurement port.

In accordance with a further aspect of the invention, the phase shifter of each T/R module is bidirectional, having a plurality of digital phase states, and optionally low noise amplifier of each T/R module have digital power and digital gain states, all states being subject to logic control. Where power or gain are controlled, the receiver is provided with a suitable amplitude error sensing circuit.

The phase of the phase shifter, in accordance with one aspect of the invention, is adjusted periodically to recalibrate the transmit operating path and receive operating path to a virtual bore sight condition. The phase error data is then stored in an eraseable memory to correct the beam steering phase commands during transmission and during reception. The same stored error data is used until the next calibration.

In accordance with another aspect of the invention, each T/R sub-assembly is provided with a read only memory (ROM) for permanently storing gain and power corrections for each module. Periodically, the gain and power are monitored at the receiver measurement port to verify acceptable performance. Should a module or modules within a T/R sub-assembly depart from acceptable performance, a failure is indicated and the T/R sub-assembly replaced. The T/R modules are themselves interchangeable prior to installation in a T/R sub-assembly in spite of quite substantial performance variations but once installed, and set to correct values by programming the ROM, they cannot be interchanged without replacing the ROM.

The result is good phase, power and gain performance in each operating path from exciter/receiver to an antenna element. The invention has preferred application to phased array radar systems operating above 3 Gigahertz and utilizing Gallium Arsenide materials in MMIC circuitry.

BRIEF DESCRIPTION OF THE DRAWINGS

The inventive and distinctive features of the invention are set forth in the claims of the present application. The invention itself, however, together with further objects and advantages thereof may best be understood by reference to the following description and accompanying drawings in which:

FIGS. 2A and 2B are two simplified block diagrams showing the calibration loops for correcting the phase errors in the transmit and the receive operating paths respectively for four antenna elements contained in one T/R sub-assembly, these diagrams being in accordance with an embodiment of the invention in which the beamformer has one plural output for four antenna elements;

FIGS. 3A and 3B are two simplified block diagrams showing the calibration loops for correcting phase errors in the transmit and receive operating paths to four antenna elements contained in one T/R sub-assembly, these diagrams being in accordance with additional embodiments of the invention in which the beamformer has one plural output for two antenna elements and one plural output for one antenna element;

FIG. 4 is a more detailed illustration of the calibration loops providing correction of phase and amplitude errors in the transmit operating paths of four antenna elements associated with one T/R sub-assembly in a radar apparatus using a monopulse beamformer;

FIG. 5 is an illustration similar to that in FIG. 4 of the calibration loops providing correction of phase and amplitude errors in the receive operating paths of four antenna elements in the radar apparatus of FIG. 4;

FIG. 10 is an exploded view with a T/R module displaced from the T/R sub-assembly and illustrating the two disconnectable microstrip to stripline transitions between the T/R module and connecting stripline circuitry.

DESCRIPTION OF THE PREFERRED EMBODIMENT

Figure 1C:
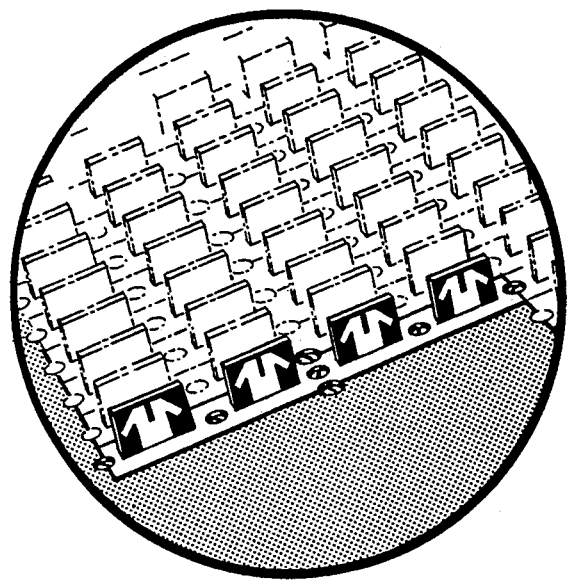
FIGS. 1A, 1B, and 1C illustrate a self calibrating phased array radar apparatus fabricated using a plurality of removable transmit/receive sub-assemblies each sub-assembly incorporating four T/R modules containing both the active electronics for four antenna elements and the antenna elements, the enlarged auxiliary view of FIG. 1B showing a T/R sub-assembly removed from the apparatus and the enlarged auxiliary view of FIG. 1C, the arrangement of the antenna elements over the antenna aperture.
Figure 1B:
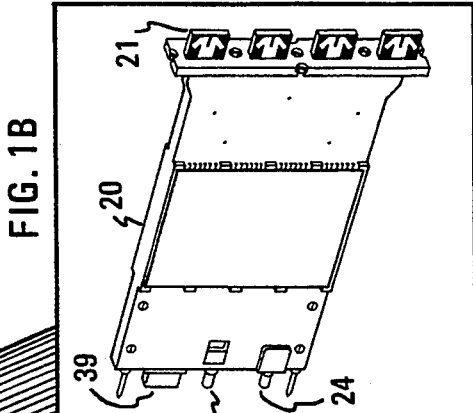
Figure 1A:
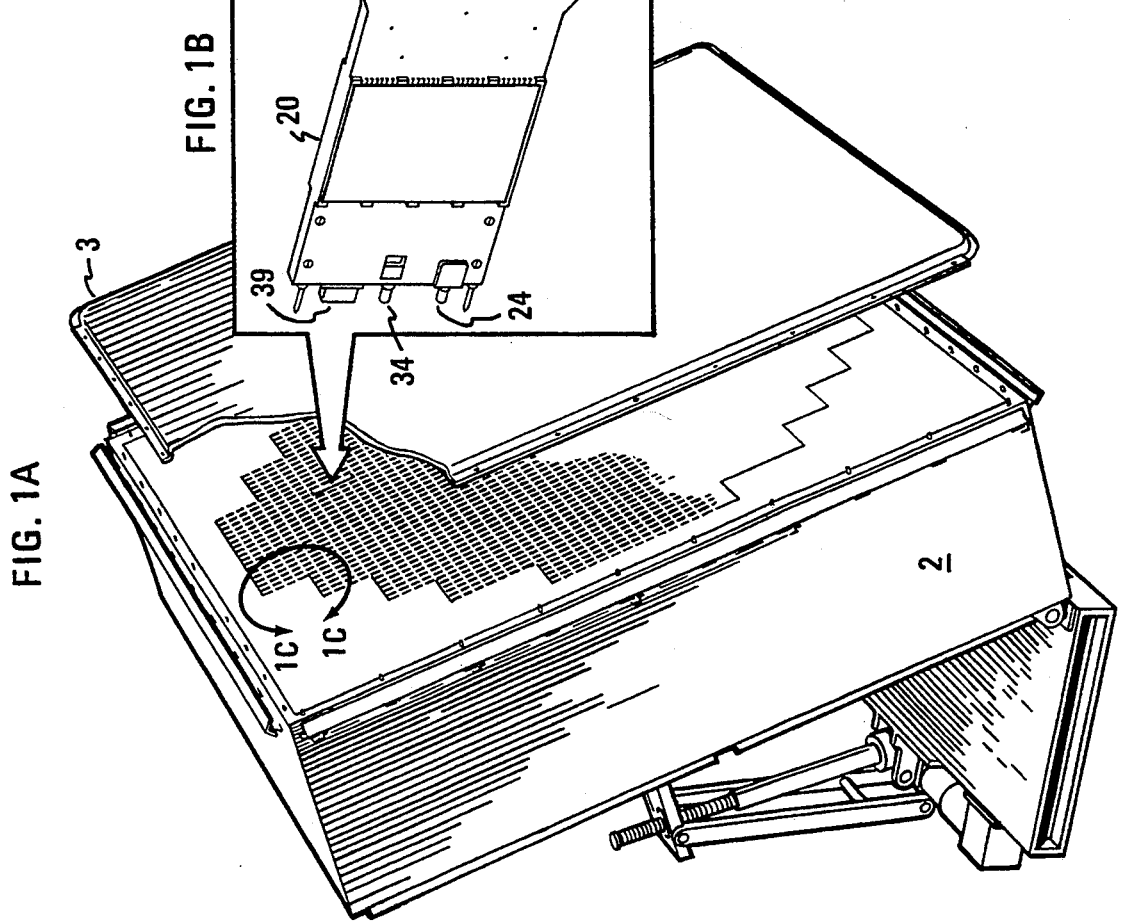

FIG. 1A is an illustration in perspective showing the aperture of a phased array radar apparatus. FIG. 1A illustrates the large rectangular housing 2 of the radar apparatus with a flat rectangular radome 3 shown displaced from its normal engaged position to expose the individual antenna elements 21 populating the array. The radome protects the antenna elements from the weather and in the case of heavy rain reduces the adverse effect of water wedging upon the beam steering. The radome is the subject of patent application Ser. No. 052,728, filed May 21, 1987, entitled "PROTECTIVE SHIELD FOR AN ANTENNA ARRAY" the invention of H. C. Ast and J. D. Reale (Docket 35-HE-1536).

As illustrated in FIG. 1C, the antenna elements 21 are arranged in rows and columns. In a practical case of 64 elements in a row and 56 elements in a column, but with the corners not filled, the total is about 3000. The 3000 or so antenna elements are in turn assembled in groups of four in a vertical line, each group forming a part of a single T/R sub-assembly 20.

The T/R sub-assembly 20 illustrated in FIG. 1B, is a plug-in unit, easily removable, to allow replacement by a like interchangeable unit. The T/R sub-assembly is arranged to fit into the rigid structural frame of the radar apparatus which is a large rectangular casting extending across the aperture. When the T/R sub-assembly is in an assembled position, the exposed face forms part of a continuous flat ground plane through which the antenna elements protrude. The normally hidden back-face of the T/R sub-assembly supports a plurality of connectors (34, 24, 39) providing the necessary signal, calibrating, and control connections to the T/R sub-assembly. The connectors are of a design which permits the sub-assembly to be engaged or disengaged from mating connectors within the apparatus by motion perpendicular to the ground plane.

Each T/R sub-assembly contains four removable T/R modules which provide the active transmit/receive electronics required to operate four antenna elements in the transmit and receive mode, a first four-way corporate signal distribution network providing singular connection of the four T/R modules to one plural tap of the beamformer and a second four-way corporate calibration network providing singular connection to one plural tap of the calibration network. In addition, local controls are provided, which in concert with a central "synchronizer" 37, enable the several operating and self-calibrating states and establish the calibration adjustments of the four modules.

The T/R modules, four of which are contained in each T/R sub-assembly, each contain all the active electronics required to perform the transmit/receive function for one antenna element. The T/R modules represent that portion of the T/R sub-assembly most prone to failure or to change in operating characteristics. They are designed for easy removal and are interchangable prior to installation in the T/R sub-assembly or for replacing a failed unit.

After assembly of the four individual T/R modules in a T/R sub-assembly, the memory in the T/R sub-assembly control logic may be altered to correct for variations between individual T/R modules. Thus, the T/R modules are not replaceable in the field, but are replaceable in a repair facility in which the memory of the T/R sub-assembly can be reprogrammed.

The radar apparatus, in an exemplary embodiment, contains approximately 700 T/R sub-assemblies arranged in 14 rows each containing 64 sub-assemblies and approximately 3000 T/R modules containing the active electronics for the 3000 plus antenna elements. The T/R sub-assemblies, while interchangeable and which thus represent the lowest replaceable unit in the field, are conceived to have a long life, with the T/R modules which are the principal source of failure, being the principal cause for T/R sub-assembly replacement.

The phased array radar apparatus, illustrated in FIG. 1A, is arranged to operate from a stationary position and to form an electronically scanned beam. Scanning of the transmitted beam may be achieved by adjusting the electrical delays imposed on a common exciter signal prior to coupling to the individual elements of the array. If each element of the array is excited with a signal of the same phase, the beam is directed along an axis perpendicular to the plane of the array. (The beam position broadside to the face of the array is also known as the "bore sight" position.)

Scanning of the transmitted beam is achieved by shifting the phase from antenna element to antenna element in nearly equal increments as one progresses across the aperture along a vertical or horizontal coordinate line. This causes the beam to be deflected vertically or horizontally from bore sight. The deflection is in proportion to the phase increment between elements of the array.

In a phased array radar, the beamforming and steering accuracy is established by the accuracy of the phase delay in the path from the exciter to each antenna element. As already suggested, the amplified output of a single exciter is used to drive each antenna element. The exciter output may be subject to some form of initial modulation, and is of a moderate power level. The exciter output is reamplified before being supplied to column feeds and to row feeds of the beamformer in the path to the antenna elements to maintain the signal well above the noise, and is given the final power amplification in a power amplifier driving a single antenna element. Before final amplification, the exciter output is passed through a digitally controlled phase shifter in the T/R module used to set the signal to the desired phase angle appropriate to each beam steering angle.

In a common radar application, the beamforming—the term applied to the formation of a beam by the networks which distribute the exciter signal to the power amplifiers—is the same for both transmission and reception. In this application, the transmitted amplitude of the signal at all elements of the array are held equal and substantially equal phase increments (plus or minus one half the least significant bit) are maintained as one steps progressively horizontally and vertically across the aperture for each beam steering position. Should a target be present at a given beam position, the echo return will arrive at the individual elements of the array in corresponding phase increments and when properly reconstituted by proceeding backwardly through the beamforming network, will produce a single pulse similar to the original transmitted pulse. The phase settings, which may be relatively coarse, may be used to adjust the beam pointing angle with relatively greater accuracy, the ultimate accuracy depending on the number of bits.

Beamforming with equal amplitudes at the antenna elements and with phases at the antenna elements progressively stepped across the aperture is, however, only one of several beamforming adjustments employed in phased array radar systems. The amplitudes of the signal supplied to individual elements of the array are frequently weighted when it is desired to reduce the side lobe levels to avoid jamming from jammers not in the path of the main lobe of the beam.

Monopulse operation, which entails beamforming with adjustment of both amplitude and phase is also common. The beamformer for monopulse transmission transmits a conventional beam (i.e. sigma) with amplitude weighting to insure optimum directivity. For reception, the sum beam is received with like or unlike amplitude weighting, and a pair of difference (delta) beams are formed in azimuth (delta Az) and in elevation (delta El).

The foregoing applications thus impose a requirement of weighted amplitude control in addition to phase control on the active electronics which process the exciter signal for transmission and on the return signal received by the antenna elements for reception. Thus the phase, the power in transmission and the gain in reception must be held to prescribed values if the radar apparatus is to perform to its design capability.

As earlier stated, active electronic elements are frequently of lower initial accuracy, and lower stability than required in a practical phased array radar system operating at high frequencies. Correction may take two principal forms. Errors attributable to manufacturing may be removed by a permanent correction as an incident to manufacturing the equipment. Thus errors in transmitter power or receiver gain may be corrected by determining the correct setting and storing the correction in a permanent memory. After manufacture, the performance is recurrently monitored. If monitoring indicates a departure from acceptable performance, the "lowest replaceable unit" containing a non-performing gain element is replaced. In the exemplary embodiment, phase errors are also subject to change and a digitally controlled phase shifter is employed. The phase shifter is subject to recurrent monitoring with the means at hand to alter that setting as departures from acceptable values are detected.

In accordance with the present invention, a removable T/R sub-assembly is provided containing four interchangeable T/R modules, each in turn containing the active electronics required for each antenna element and providing means for logically controlled phase, or phase and amplitude adjustment. Each module provides these adjustments in the operating paths from the exciter to an antenna element and from the antenna element to the receiver. The T/R sub-assembly which controls the settings of the modules provides separate settings for the transmitted signal and for the received signal since different electronics are employed. The calibration process, which insures the accuracy of the settings, contains an internal standard, and permits continuous, on-going calibration in the beamforming process.

The use of T/R modules with logically controlled phase and/or power and/or gain together with suitable design of the overall radar apparatus and suitable phase and amplitude sensing circuits in the radar receiver permits one to achieve the desired phase/amplitude/gain responses in each operational path to the accuracy required to achieve design performance.

FIGS. 2A and 2B are simplified block diagrams of an embodiment of the invention illustrating the calibration loops for transmission and reception respectively of a T/R sub-assembly for four antenna elements 21 (i.e., the jth sub-set) in a radar apparatus. The sub-assembly includes the four antenna elements and four T/R modules (each containing elements 27, 28, 29, 30, 31), the elements of each module providing the means for phase adjustment of each active antenna circuit for transmission and for reception. (In FIGS. 2A and 2B, the reference numerals used and the description is also applicable to the more complete diagram provided in FIGS. 4 and 5.)

Figure 7:
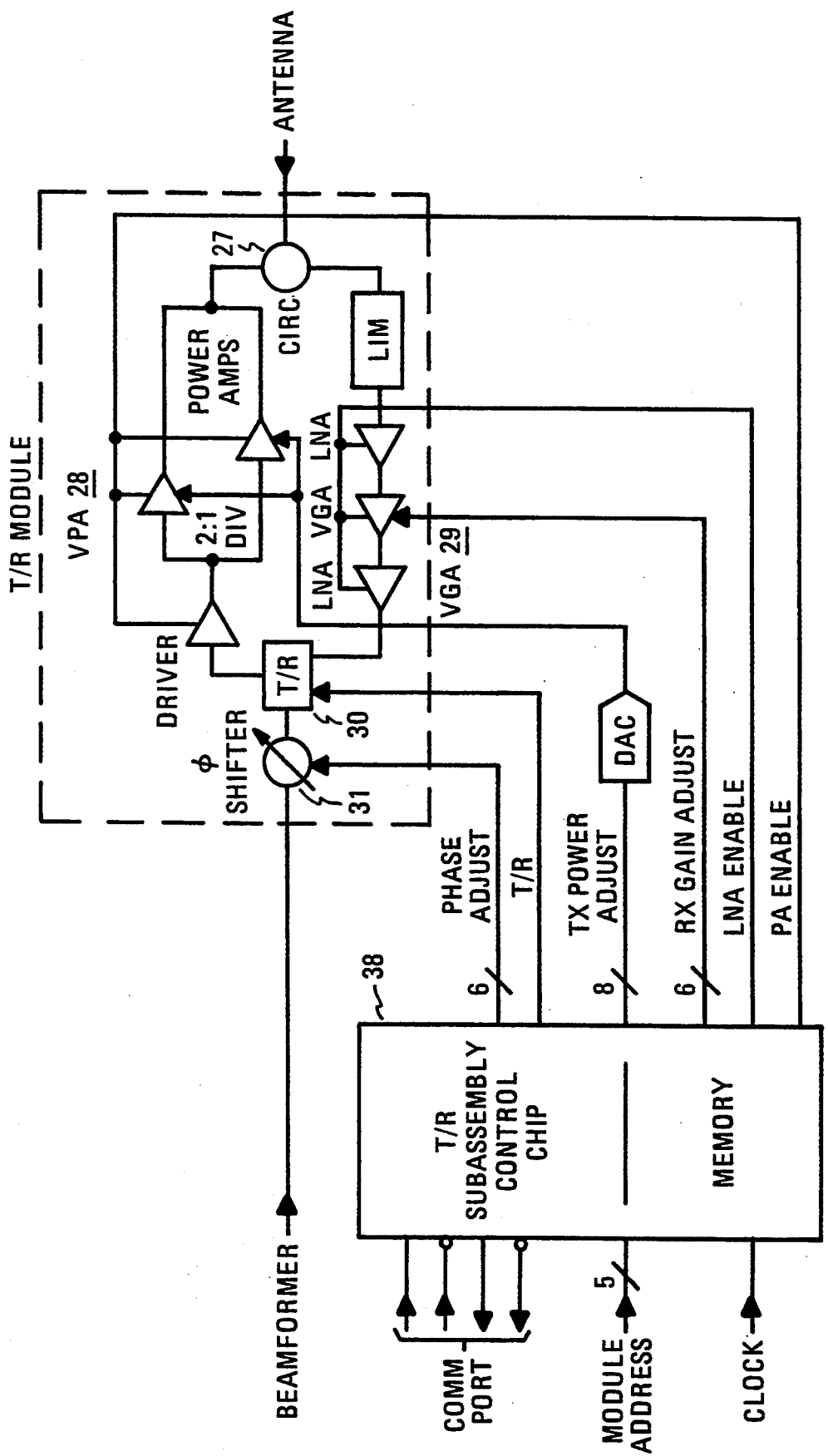
FIG. 7 is a diagram of the control function for adjusting the states and settings of an adjustable T/R sub-assembly showing a control chip and the connections to one T/R module in an embodiment in which phase, power, and gain are subject to control.
Figure 8:
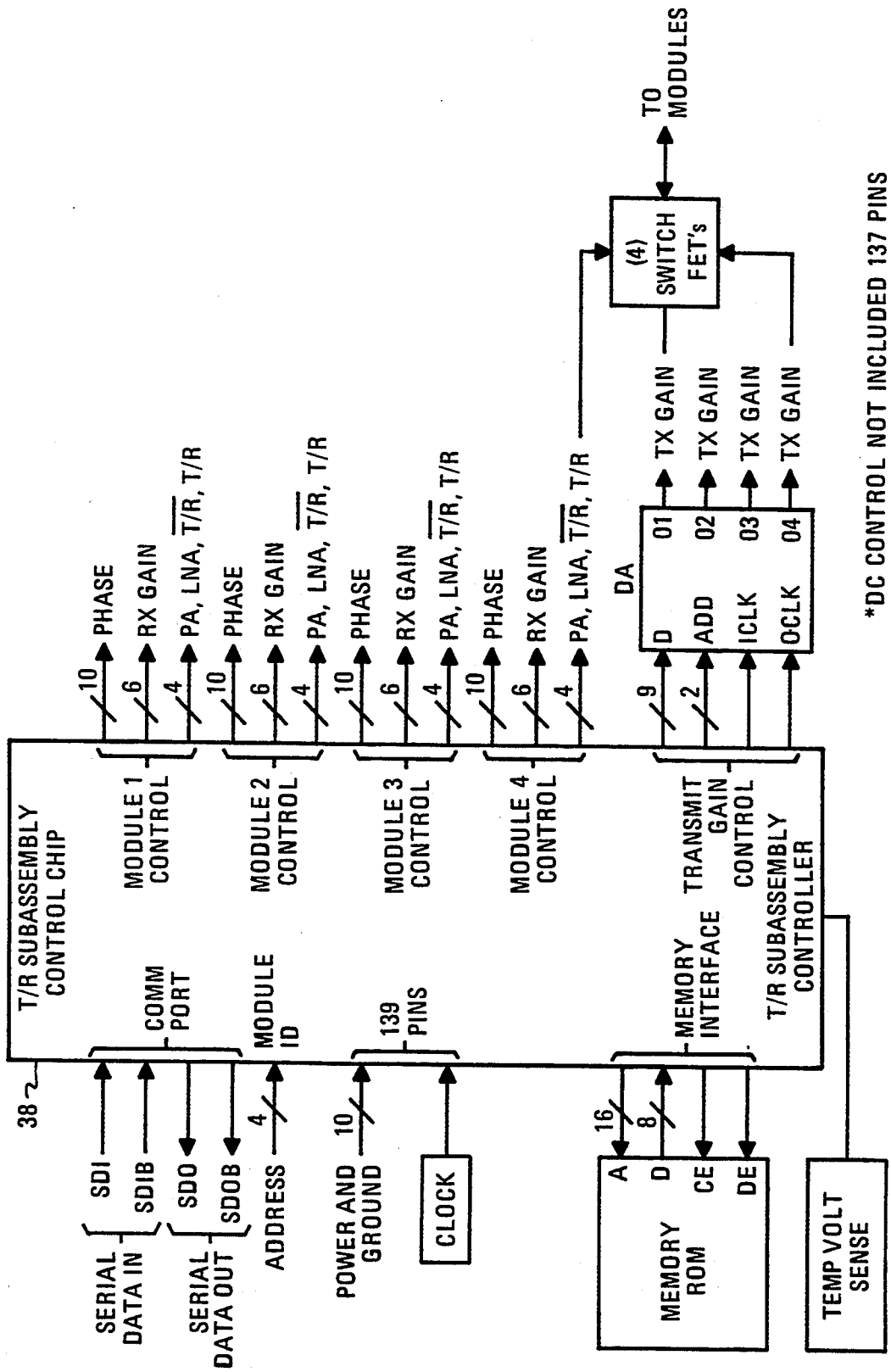
FIG. 8 is a diagram of a T/R sub-assembly control chip, providing the control connections to four individual T/R modules on the T/R sub-assembly in an embodiment in which phase and gain are subject to control.

Control of the radar apparatus is effected at the system level by the synchronizer 37, operating with the receiver 11, which provides stored error data, and by a control chip 38, which effects control within each T/R sub-assembly 20 of the individual T/R modules containing the active electronics. The controls illustrated in FIG. 2A are restricted to the phase shifters 31, and the enablement of the individual T/R modules 26 and state selection. More complex control functions present in two practical embodiments are illustrated in FIGS. 7 and 8.

FIG. 2A, thus, deals with the correction of the phase errors in the transmit operating paths for the four antenna elements 21, part of the T/R sub-assembly 20. The T/R sub-assembly 20, in the simplified form shown in FIG. 2A, comprises four similar channels, each channel containing a T/R module (26) consisting of a logically controlled phase shifter 31, and T/R electronics package 27, 28, and 30. In addition, the T/R sub-assembly provides a signal distribution network (33) for connecting the beamformer to the T/R modules, a calibration distribution network (25) for connecting the antenna elements to a calibration network (15, 16) and logical control 38 connected to a control synchronizer 39.

More particularly, the radar apparatus, as shown in FIG. 2A, consists of an exciter 10 providing signals for both transmission and transmit path calibration; a receiver 11 with a calibration error sensing circuit having a reference and a measurement input terminal; a beamformer (13, 14) providing beamforming paths in the transmitting column feed 13 and the transmit/receive row feed 14 during transmission and transmit path calibrate, leading to the exciter/receiver signal terminal 34 of the illustrated T/R sub-assembly and ending at the integral antenna elements 21); and the calibration feeds (15, 16) providing calibrating paths starting at the integral antenna elements and ending at the measurement error sensing terminal at the receiver 11 during transmission and transmit path calibrate. The calibration feeds are subdivided into a column feed (15), and a row feed (16) both corporate in nature (i.e. having paths from a singular port to each of the plural ports ideally of equal electrical length and all branching producing equal power division/summation).

During transmission and transmit path calibration, exciter signals are coupled from the plural ports of the beamformer 13, 14 to the terminal 34 of each T/R sub-assembly 20. A four-branch corporate feed network 33 within the T/R sub-assembly, having its singular port coupled to the terminal 34 distributes the exciter signal to each of its four plural ports via a stripline to microstrip transition 23 (illustrated in the exploded view of FIG. 10) to each of the four controlled bi-directional phase shifters 31 forming the first element of each T/R module.

After separate passage through each of the four phase shifters, the separately processed exciter signals are coupled to the serially connected T/R electronics block (the remainder of each T/R module) following each phase shifter. Each T/R electronics block (for purposes of transmission or transmit path calibration) consists of the elements 30, 28 and 27 respectively. As illustrated in the more detailed view of FIG. 7, the T/R switch 30, switches the exciter signal to the power amplifier 28, and the circulator 27 branches the power amplifier output in the path to the antenna element 21.

During transmission, all antenna elements are powered and a beam is formed. During transmit path calibrate one antenna element is powered at a time under control chip control, and no true beam is formed.

Accordingly, during transmit path calibrate, only one of four amplified exciter outputs exists, and is coupled from one of the four circulators 27 via the primary path of one of four directional calibration couplers (22) to one of the four antennas 21. The directional couplers have a secondary path coupled to the primary path with an attenuation of twenty db. The twenty db couplers are sited close to their associated antenna elements to reflect as nearly as possible the phase and amplitude of the antenna excitation. Thus as it reaches the active antenna element, a reduced sample of the amplified exciter output—now the transmitter output—is replicated at the secondary output of one directional coupler.

In the course of the calibration process, four attenuated samples of the transmitter signal, virtual copies of the signal radiated by each of the four antenna elements are separately derived by each of the four directional couplers, and coupled to a plural port of the four-way corporate feed network 25. The four samples proceed at different times from the plural ports of 25, via the singular port of 25 to the terminal 24, where they pass from the T/R sub-assembly to the calibration feed networks 15/16.

The four samples then proceed through the calibration feed networks (15, 16) back to the measurement terminal of the phase error sensing circuit of the receiver 11. Here comparisons occur between the reference formed by an exciter output directly coupled to the reference terminal of the error circuit and the samples which have pursued a path including the transmit operating path and the calibration path. The operating path calibration loops are thus closed at the error sensing receiver, and a measurement of the phase delays of the operating paths in respect to a reference are now made. Should the circuit indicate errors in phase from the desired value, the errors are stored in the receiver 11, and coupled via the synchronizer 37 to the control chip 39, where they are used to readjust the settings of the four phase shifters 31 to offset the error in each of the four paths being calibrated.

The calibration process, as it applies to the transmit and receive operating paths, is performed under the control of the synchronizer 37 acting through the control chip 38 on each of the 700 T/R sub-assemblies. The calibration for the entire apparatus involves an appreciable amount of time (on the order of a minute). While full calibration may occur when the radar equipment is started up, it may also be accomplished piece-meal, in vacant time intervals present during normal radar operation.

The synchronizer 37 and the control chips 38 in each of the T/R sub-assemblies, control the state of transmit path calibration in the manner just explained, and in addition, control the occurrence of the three other principal states. The other states include transmission, receive path calibrate, and reception. The transmission mode, for instance, entails simultaneous operation of all four modules of all T/R sub-assemblies in a transmission state while transmit path calibration entails the operation of only one module at a time in a transmission-like state, in a time sequence including all T/R sub-assemblies. The synchronizer 37 and control chips 38 effect these states in each T/R module by means of enable controls as illustrated in FIG. 2.

The correction of phase error in the m×n transmit operating paths requires one phase shifter per path, and one that retains its setting and may be incremented from such settings during beam steering. The phase shifter must be capable of being reset to a value correcting for any departure from the desired reference value during calibration with the ability to continue through 360°. When all paths are calibrated, a virtual bore sight condition is produced. During transmission the phase correction must be retained as a "true" zero phase setting to which phase increments are added in steering the beam to a desired offset from a bore sight condition. This requirement may be filled by a digital phase shifter, typically of 4 to 6 bits subject to logical control. A suitable phase shifter is that described in the U.S. Pat. No. 4,638,190 of Hwang et al filed May 20, 1985, assigned to the Assignee of the present application and entitled "Digitally Controlled Wideband Phase Shifter".

The T/R sub-assemblies (20), with the four T/R modules (26) included within, contribute a substantial part to the phase error in each path while containing the means to correct the phase error for each transmission path. The stripline networks 33 and 25 are of high reliability and low phase error, while the active electronics including the phase shifters themselves are less reliable and exhibit significant phase error. The blocks within the modules 26 applicable to transmit path calibration, include the power amplifier 28, the T/R device (30) and a circulator 27, which perform the necessary steering of the exciter signal into the input of the power amplifier (28) and from the output of the power amplifier (28)

into the path to the associated antenna element (21). (Also included in each T/R module is a low noise amplifier (29), inactive during transmission, which does not contribute to the phase error during transmission.)

Each phase shifter 31 corrects for phase errors in the associated T/R module 26, in the signal distribution paths of the T/R sub-assembly 20, and in the remainder of the path from exciter to the associated antenna element. A principal part of that remainder is the beamformer 13, 14.

Figure 6:
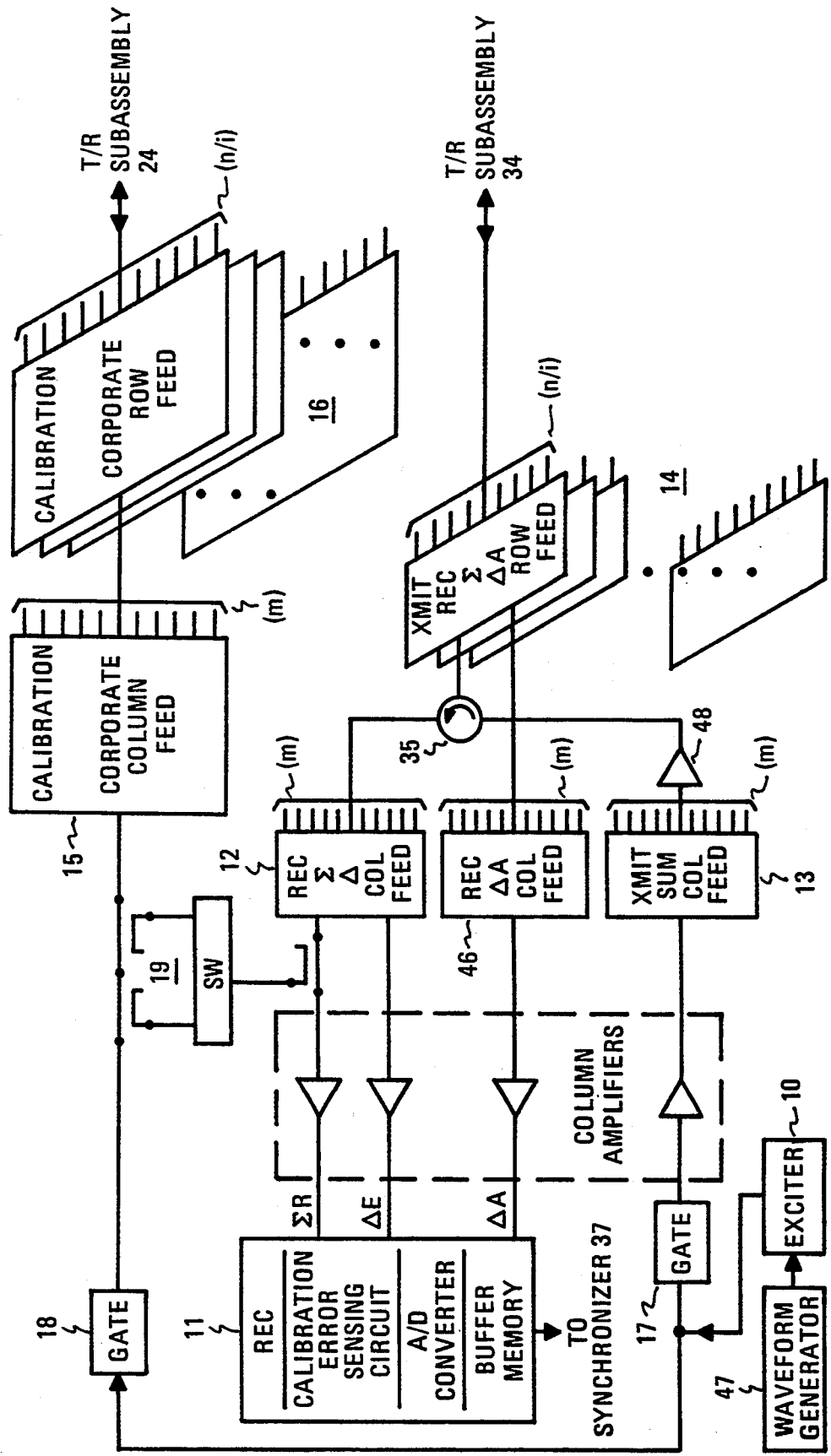
FIG. 6 is an illustration of the paths between an exemplary T/R sub-assembly and exciter and receiver in a monopulse beamformer and calibration feed network of a phased array radar apparatus similar to that illustrated in FIGS. 4 and 5.

The beamformer is connected between the exciter 10 and the port 34 of the jth T/R sub-assembly 20. The beamformer 13, 14 consists of row 13 and column 14 feed networks and includes amplifiers to sustain the exciter signal level as branching occurs (as illustrated in FIG. 6). Since only a single input connection is made from the exciter 10 into the beamformer 13, 14 and only a single output connection coupled from the beamformer to the T/R sub-assembly 20 (at 34), one unique path through the beamformer is involved for a selected jth T/R sub-assembly. (It is the same beamformer path, also for any antenna element made a part of the jth T/R sub-assembly.) The phase delay in the unique path through the beamformer 13, 14 is, accordingly, a fixed quantity which combines with the other phase delays present in the path from exciter to a particular antenna element.

The enablement of one T/R module at a time during transmit path calibration, which is accomplished by disabling the other three modules and allowing the exciter signal to flow through only one module at a time, also avoids redundancy in the path through the T/R sub-assembly for the particular antenna element during transmit path calibration, assuming no mutual coupling between the circuits within the T/R sub-assembly.

Thus the phase delay in the full path from exciter to the particular antenna element is a fixed and accessable quantity, which may be readily corrected to a desired value by the installation of a logically controlled, adjustable phase shifter in each path. The phase shifters 31, present in numbers of one per T/R module (26), four per T/R sub-assembly (20), and 3000 plus for the complete radar apparatus, thus provide the necessary degrees of freedom for correction of every transmit path.

The calibration measurement for each path is achieved, in accordance with the invention, by coupling the exciter output as it reaches each antenna element back by a path of known electrical length to the measurement terminal of a phase comparison network. At the same time, a signal direct from the exciter is coupled to the reference terminal of the comparison network. The phase error in the operating path is then obtained by subtracting the known phase delay in the calibrating path from the observed phase delay experienced by the exciter signal in traversing both the transmit operating path and the calibration path.

The calibration path includes the row feed network 16 and the column feed network 15, both "corporate" in nature. The term "corporate" is intended to mean that each path from a singular to a plural port is made to have substantially the same electrical length (i.e. phase delay). The path length once each path is constructed and interconnected into a test fixture is normally measured to a higher degree of accuracy than can be economically achieved by construction, and the value of the residual error is stored in a computer memory and used to remove any error it might cause in the calibration process. The eventual accuracy based on near 0.001" tolerances is a small portion of a degree depending upon frequency.

For the calibration process to work, the calibration networks must provide a single calibrated path from the ports 24 of each of the 700 T/R sub-assemblies to the measurement input of the calibration error sensing circuit at the receiver 11. In addition, the couplers 22 and the corporate networks 25, within the individual T/R sub-assemblies, must provide paths of equal length from each antenna element to the port 24.

The calibration networks 15, 16 meet the condition by providing a single path of known phase delay to the transmitter signal between the port 24 of each T/R sub-assembly and the measurement input of the calibration error sensor at the receiver 11. The calibration network accordingly must have a plural port in the row feed for each T/R sub-assembly. The transmitter output at the port 24 of the jth sub-assembly is coupled to a plural terminal of the row feed 16 assigned to that sub-assembly. The transmitter output reappearing at the singular port of the row feed 16, is next coupled to a plural port of the calibration column feed 15. Finally, the transmitter output reappears at the singular port of the calibration column feed, which is coupled to the measurement input of the receiver 11.

The reference phase used for calibration of all operating paths may be completely arbitrary, so long as it is stable in relation to the exciter. This is true because the phases of the signals at each antenna element relative to the phases at the other antenna elements are relevant to beam formation and steering, while the absolute phases of these signals are not relevant since they affect neither beam formation nor steering.

The calibration process accordingly entails setting each phase shifter, which has settings to binary fractions of 360°, to the nearest phase correspondance with the exciter reference, followed by the addition of a correction derived from storage representing the departure from the norm of a particular calibration path in 15, 16. When transmission or reception states are active, the phase increments required for steering to arbitrary angles, accordingly, are combined with the "true" zero values at each antenna element to provide a correction for the phase responses of the different paths through the beamformer and the active electronics in the T/R sub-assemblies.

While there is a high degree of accuracy (errors of less than 1°) in the calibration process, there is at the same time a desirable randomization of the settings of the individual phase shifters.

The phase shifter, if of a four bit variety, has a minimum step of $22\frac{1}{2}°$ between settings and if of a six bit variety, has a minimum step of $5\frac{5}{8}°$ between settings.

The beam pattern is normally enhanced in an array using digital phase shifters when the errors are randomized over the antenna aperture. This dictates half a minimum setting as the optimum random error and dictates a random distribution of the errors among the phase shifters sharing a common vertical or horizontal line.

Figure 11A:
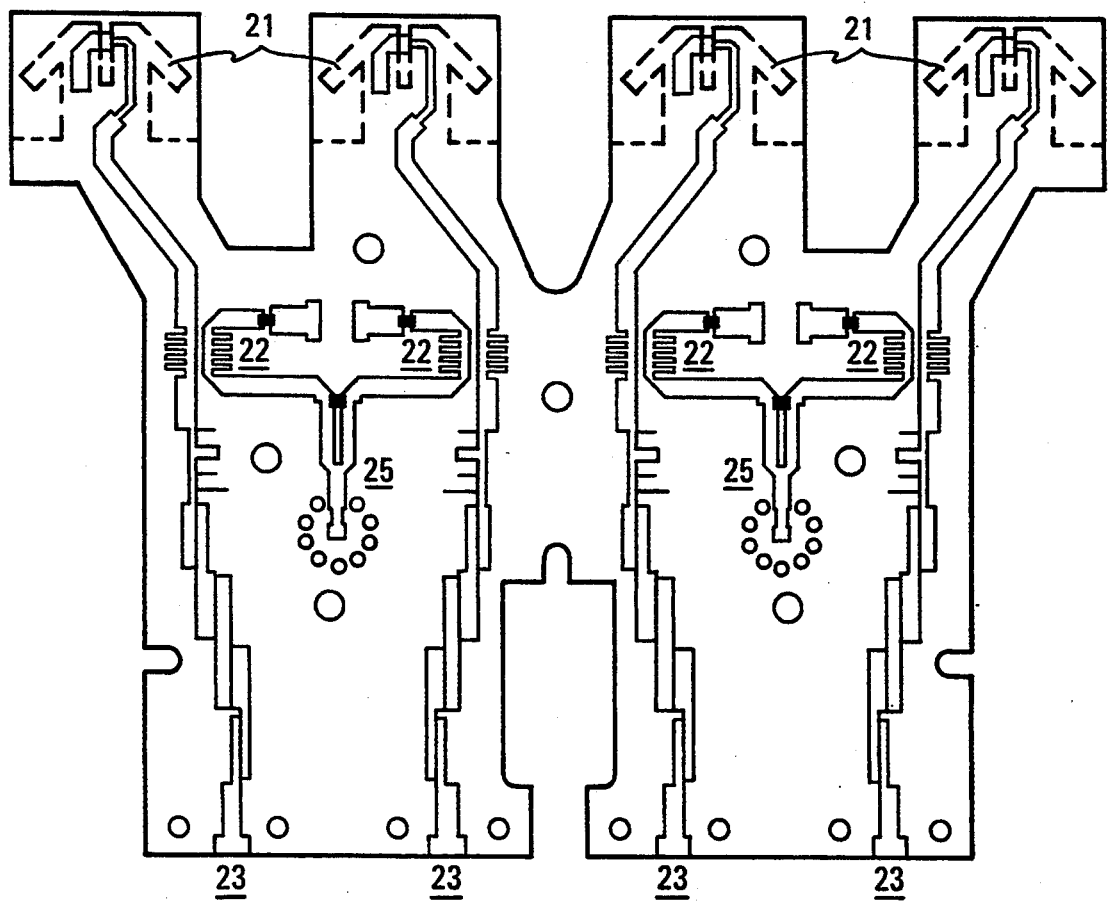
FIGS. 11A and 11B are illustrations of exemplary stripline portions of the T/R sub-assembly by which four T/R modules are connected to four individual antenna elements and the four-way corporate divider providing a singular calibration connection for the T/R sub-assemblies.
Figure 11B:
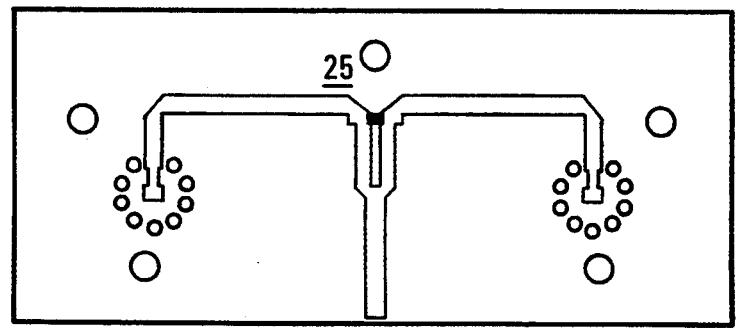

The requirement for phase accuracy occurs principally in the individual paths of the calibration networks 15, 16, as already noted, and in the four-way corporate feeds 25 of each T/R sub-assembly 20. The geometry of the four-way corporate feeds 25, must be carefully adjusted to insure equal phase delays for the paths from each antenna element to the common port 24. They are constructed using a stripline construction with lithographic layouts carefully adjusted to equalize the phase delays in the electrical paths. A suitable stripline printed circuit layout for 25 is illustrated in FIGS. 11A and 11B. The layout accuracy is maintained to 0.001", with an intended phase accuracy of a small portion of a degree depending upon frequency.

The remaining signal paths in the apparatus are generally less critical to optimize phase performance. For instance a similar symmetry, but with less effect upon the calibration accuracy, is utilized in the four-way corporate feed 33 connecting the beamformer to the individual T/R modules. Accuracy (ideally) is not critical in feed 33 because it is within the transmit operating path and corrected by the feedback loop. Also (ideally), the paths from the exciter to the receiver calibration input, from the exciter to the beamformer input, and from the singular port of the calibration column feed to the receiver calibration input are not critical. This is true because they are common to all operating paths to all antenna elements and affect only the absolute phase.

The phase accuracy of the individual antenna elements in thus set by the accuracy of the four-way divider 25, and the care with which the 700 paths in the calibration network 15, 16 are equalized and the accuracy with which the phase error remaining in the calibration network 15, 16 is stored and used to correct individual beam steering commands.

FIG. 2B deals with the correction of the phase errors in the receive operating paths for the same four antenna elements associated with the jth T/R sub-assembly 20.

As seen in FIG. 2B, the radar apparatus (to the extent detailed in FIG. 2A) consists of substantially the same principal components; the exciter 10, receiver 11, a beamformer—but now using receive sum and delta column feed 12 and the transmit/receive row feed 14, and the calibration feeds 15 and 16. The beamformer paths for receive path calibration thus do differ from those used for transmit path calibration, and the details are shown in FIG. 6 for a monopulse radar apparatus. In a simple non-monopulse radar this difference is not present. However, similar to the transmit path calibration, a unique path is provided through the beamformer between the port 34 of each T/R sub-assembly and the measurement input of the receiver 11.

The receive path calibration differs principally from the transmit path calibration in the reversal of the direction of the signal flow through the calibration and the operating signal paths. In receive path calibration, the exciter 10 supplies a signal directly to the reference input of the calibration error sensing circuit and directly to the singular port of the calibration networks 15, 16. The measurement signal then traverses the column feed network 15 and the row feed network 16 and is coupled via the port 24 into the antenna circuit of the jth T/R sub-assembly. The measurement signal is next coupled via the four-way corporate divider 25 into the antenna circuit by means of the directional couplers 22. The directional couplers launch the measurement signal in the direction followed by a signal picked up by the antenna elements and fed to the receive paths. The calibration path then ends at the directional couplers next to the antenna elements.

In receive path calibration, the calibration network 15, 16 is the same as the calibration network used during transmit path calibration, and the paths associated with each T/R sub-assembly are used for both calibrations although the directions of the measurement signal through the network are reversed.

In the receive operating path, the measurement signal proceeds from the selected antenna element 21 to the associated T/R module 26 containing a phase shifter 21 and the transmit/receive electronics (27, 29, 30). In the receive path, the measurement signal enters the circulator 27, is directed into the variable gain amplifier 29, and after amplification enters the T/R device 30, which is arranged to direct the measured signal to the phase shifter 31. The phase shifter output is coupled via the corporate feed network 33 to the port 34 of the T/R sub-assembly. The measurement pulse then proceeds into a plural port of the beamformer elements 12, 14, and exits at the singular beamformer port which is coupled to one input of the calibration sensing circuit in the receiver 11.

As in transmit path calibration, the individual modules within the T/R sub-assembly are subject to enabling controls during receive path calibration, which turn off each module except the one being calibrated. A control signal is provided for adjusting the adjustable phase shifter 31 in the path being calibrated to the appropriate true zero value.

Calibration for receive path calibration functions substantially as in transmit path calibration. Under the control of the synchronizer 37 and control chip 38, the states of either reception or receive path calibrate may be enabled. The reception mode entails simultaneous operation of all four modules of all T/R sub-assemblies in a reception state while receive path calibration entails the operation of only one module within one T/R sub-assembly at a time in a reception like state. Thus, for calibration, the phase response of each of the four receive paths in the same T/R sub-assembly is isolated for separate adjustment, and the adjustments occur in sequence.

The control chip 38 provides a control for resetting each phase shifter 31 in the selected T/R sub-assembly to a corrected value taking into account a stored value for the error in the calibration path 15, 16. When reception is in process, and all T/R modules are in operation, the true zero values obtained during calibration and stored, are obtained from storage, and used to correct beam steering commands supplied to the phase shifters. The effect on the antenna pattern of the digital nature of the phase shifters and the need for a significant random error, in the individual phase shifters, and for randomness in the disposition of the phase shifters over the antenna array is also present for reception.

FIGS. 2A and 2B have been simplified so as to show more clearly the calibration loops, and the fact that for reception, the measurement signal progresses first through the calibration path and secondly through the operating path while for transmission, the measurement signal progresses first through the operating path and secondly through the calibration path.

The drawings of 2A and 2B omit the details of the circuits which produce this reversal. These details are shown in FIGS. 4 and 5. The receiver 11 uses the same port for both the measurement pulse and the reference pulse, but they originate as separate signals. The switching mechanisms which reverse the calibration loops include the gates 17 and 18, and the switch 19 including three directional couplers. The phase error measurement entails two measurements in succession, it being assumed that the exciter retains phase coherence, and that the receiver contains a local oscillator derived from the exciter to maintain phase synchronism with the exciter.

During transmit path calibration, the gate 18 opens and a reference signal is coupled via a first directional coupler (part of 19) in path 42 through the switch 19, a second directional coupler (part of 19) in the path between column feed 12 and receiver 11, by means of which it is coupled to an input of the receiver 11. For the transmit path measurement, the gate 17 opens and the signal is admitted to the transmit column feed 13. The exciter signal proceeds down the transmit operating path 40 to the dipole elements 21 and returns along the calibration path 41 via the directional couplers 22, the corporate feed 25, and the calibration feeds 16 and 15 to the third switch 19 (part of 19). At this point, the third directional coupler (part of 19) accepts the calibration measurement signal and couples it via the second directional coupler into the path between the receiver column feed 12, to the receiver 11. Thus, the reference and measurement pulses are coupled at successive instants of time to a calibration sensor circuit within the receiver 11 which measures the difference in phase between the successive signals.

During receive path calibrate, the transmit gate 17 remains closed and both the reference and measurement signals proceed along the paths 43, 45 to the gate 18. The reference signal is coupled via the switch 19 and its directional couplers to the input of the receiver 11. The measurement signal proceeds along calibration path 43 to the calibration feeds 15 and 16 respectively, enters the antenna circuit of the T/R sub-assembly via the port 24, the distribution network 25, and the directional couplers 22 and then proceeds down the receive operating path 44 toward the receiver. The measurement signal exits the receive column feed 12 and enters the receiver where it undergoes a phase comparison with the preceeding reference signal.

The foregoing switching arrangement is convenient for taking into account the nature of a conventional radar receiver. Other implementations are practical, and have been symbolized by a pair of controlled single pole double throw switches in the embodiments illustrated in FIGS. 3A and 3B.

The embodiment illustrated in FIGS. 2A and 2B and 4 and 5 contemplates an arrangement in which four antenna elements 21 are coupled to one (plural) port of the beamformer. This arrangement is practical in phased array radars in which one can tolerate sub array grating lobes commencing approximately 25° above and below the bore sight position.

In an arrangement which moves the sub array grating lobes out to 40° above and below the bore sight position, two taps (34') to the beamformer instead of one may be used as illustrated in FIG. 3A. Here the T/R sub-assembly differs from the first embodiment only in respect to the stripline feed network 33. Instead of a four branch corporate feed network 33, two two-branch corporate feeds 33' are required. As before, precision in the corporate feeds 33' is not required since they are within the operating portion of the calibration loop which is subject to correction. In the FIG. 3A embodiment, no change is required in the calibration paths, and only a single tap for four antenna elements is required. There is no added complexity in the control function provided by the control chip 38.

In accordance with a further embodiment of the invention in which low side lobes overall are desired, four ports (34") to the beamformer may be provided, one for each of the four phase shifters 31. As before, the T/R sub-assembly may be substantially the same as that illustrated in the two prior embodiments, differing only in respect to the stripline networks 33 by which signals are coupled from four individual taps on the beamformer to the four individual T/R modules.

The discussion of phase adjustments of the two operating paths in three embodiments of the invention represents only two of four common adjustments desirably applied to the operating paths. FIG. 7, for instance, shows a control arrangement in which each T/R module within the T/R sub-assembly is subject both to phase control for transmission, phase control for reception, but also power control during transmission and gain control during reception. (The number of control states are indicated by the number of parallel bits in the control paths, but are exemplary only, and depend upon specific requirements.)

As illustrated in FIG. 7, the T/R module has a phase shifter 31 subject to phase adjustment for both transmit and receive and a power amplifier 28 and a low noise amplifier 29. The power amplifier 28 includes a driver amplifier and a dual output stage. The power amplifier is subject to power control and enabling. The low noise amplifier 29 consists of three stages, the second one of which is subject to a digital variable gain control. The control connections from the control chip 38 to one module are detailed in FIG. 7.

The circuit elements depicted in FIG. 7 for an embodiment operating at frequencies above 1 Gigahertz should employ a high frequency bulk material such as Gallium Arsenide for the active devices. Since Gallium Arsenide is semi-insulating, a Monolithic Microwave Integrated Circuit (MMIC) construction is preferred in which both active and passive circuit elements are formed by a photolithographic technique in the bulk material. The separate requirements for phase shifting, low noise amplification and power amplification, and particularly heat dissipation dictates that the full T/R module circuit be formed in a hybrid fashion with more than one "MMIC" device formed on a common larger substrate.

The digitally controlled phase shifter and digitally controlled gain elements may take the form described in U.S. Pat. No. 4,638,190 entitled "Digitally Controlled Wideband Phase Shifter" and U.S. Pat. No. 4,734,751 entitled "Signal Scaling MESFET of a Segmented Dual Gate Design", both filed May 20, 1985, and assigned to General Electric Company. The low noise amplifier may take the form illustrated in the U.S. patent application Ser. No. 100,416 filed Sep. 24, 1987, entitled "A MMIC Low Noise Amplifier" of Anthony W. Jacomb-Hood and assigned to General Electric Company.

In FIG. 8 another description of the sub-assembly control chip 38, illustrating the control connections to each of four modules, and exemplary numbers of parallel bits necessary to affect the desired control precision.

FIG. 8 also illustrates the two auxiliary elements of the control chip 38 and the connections between the control chip 38 and the synchronizer 37. The synchronizer provides central control of the states of the radar apparatus and of the beam settings of all T/R sub-assemblies acting through connections provided by the connector 39. The auxiliary elements of the control chip 38 include a digital to analog converter, and a ROM memory.

Figure 9:
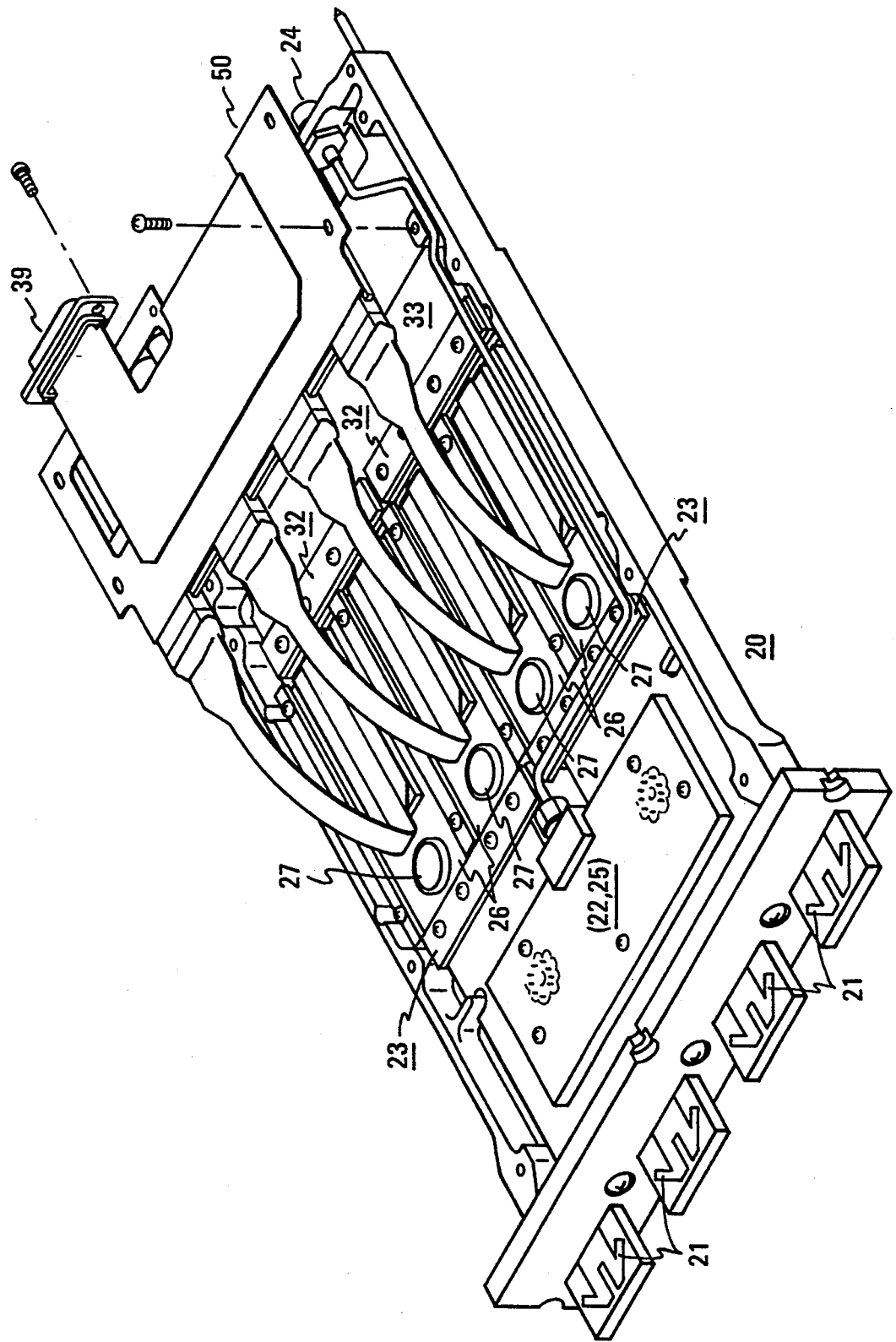
FIG. 9 is a perspective view of the mechanical features of a single plug-in T/R sub-assembly illustrating four individual T/R modules in assembled position with the control logic board and control connector displaced above the assembled position.

The provisions for housing the control logic and power conditioning are illustrated in FIG. 9. A flat aluminum substrate 50 is provided, designed to be fit within the side walls of the sub-assembly and which with the bottom of the sub-assembly defines the space for accommodating the control logic and power conditioning circuits. The circuit board providing these functions is supported on the undersurface of the substrate. Edge contacts on the circuit board mate with four connectors leading to each of four T/R modules 26 to provide the necessary control and power connections to each T/R module. The main power and control connector 39, by means of which central logic control and power are provided to the T/R sub-assembly, is shown at the back edge of the aluminum substrate 50. The T/R sub-assembly connector 39 fits into the rear wall of the T/R sub-assembly, and in turn connects the T/R sub-assembly into connectors provided in the housing 2 of the radar apparatus.

The power and gain corrections and settings for different states of the individual T/R modules may be controlled in the same manner as the phase corrections and settings, but in the usual case recurrent calibration is unnecessary. The power and gain properties of the amplifiers have adequate stability to meet customary system requirements, and these properties are recurrently monitored to sense a departure from an acceptable value, after which replacement or repair would take place.

Calibration of power and gain occurs before installation of the T/R sub-assembly into the radar apparatus and the necessary settings are stored in local memory. As illustrated in FIG. 7, the transmitting power level in the power amplifier 28 may be adjusted in an arbitrary number of digital steps by means of a variable gain power amplifier. Similarly, the low noise amplifier 29 includes as its second stage a variable gain amplifier, whose gain may be adjusted in $2^6$ (64) digital steps. The resolution provided may be selected consistently with the performance requirements of the system. Before the T/R sub-assembly is finally installed in the radar apparatus, the gain of the power amplifier driver and the low noise amplifier are calibrated. When the desired values are obtained, the settings of the controls required to achieve standard gain and standard power are stored in the memory associated with the sub-assembly control chip 38. These values then become a reference from which commands to adjust the weighting depart.

Monitoring the accuracy of the power and gain settings utilizes the calibration loop and normally accompanies phase calibration. The power and gain monitoring is performed in the calibration error sensing circuit of the receiver 11. The receiver is preferrably provided with an internal amplitude standard, which is compared to a measurement signal of a suitable known amplitude provided from the exciter and passed through the active circuitry in the operating paths. After following the transmit or receive operating path, the amplitude of the measurement signal at the receiver input represents the power imparted by the variable power amplifier 28 or the gain imparted by the variable gain amplifier 29 and thus monitors the performance of these elements of the T/R module.

A T/R sub-assembly having a memory, which stores the zero settings for phase, gain and power of the constituent T/R modules, though each T/R module is initially different, becomes interchangeable with other T/R sub-assemblies without adverse effect on the performance of the total array.

The T/R modules provided in each T/R sub-assembly are restricted to a small number. The accuracy of the final network 25, utilized to calibrate the paths to the individual antenna elements, must be executed with care in the equality of the path lengths, and is preferably a corporate feed, which may be branched once, or twice, or perhaps three times without significant loss in accuracy to allow for two, four, or eight modules. Cost and other constraints lead to a preference of two T/R modules over one, and four over two, and tend to favor four over eight at frequencies above about 3 Gigahertz.

Other factors also tend to favor the inclusion of four modules in a T/R sub-assembly over other numbers of modules. Each T/R sub-assembly is required to stay within the front panel limits set by the radiating elements, and their spacial requirements. In a practical radar system operating at 5–6 Gigahertz the interval between each radiating element is approximately $1\frac{1}{4}$ inches horizontally and $1\frac{5}{8}$ inches vertically. Beam pattern requirements normally dictate that the antenna elements in a single sub-assembly lie in a single row or column. A preferred orientation is also normally indicated in applications where the beam is scanned through smaller angles in elevation than in azimuth (or vice versa). In the former case, the radiating elements should lie in a vertical line with the individual dipoles also vertically aligned. The result is a flat and elongated package.

However, since the power dissipation is very high, passages on either side of the T/R sub-assemblies must be provided for adequate ventilation. This factor tends to make the sub-assembly thinner by as much as a factor of two. Granted that a thin configuration is required, providing adequate power conditioning capability and adequate local control logic within the available space then becomes difficult. Local power conditioning represented largely by storage capacitors is ideally thick. However, with careful power supply design, as is described in U.S. patent application Ser. No. 140,292 of William Peil entitled "A Regulating Switch For Transmitting Modules In A Phased Array Radar", a suitably compact and suitably thin power supply may be devised for a T/R sub-assembly, adequate to power and control four modules and adequately small to fit within the available space.

A final factor influencing the number of modules per T/R sub-assembly is the requirement of adequate connector space with adequately short power connections for the efficient supply of high power pulsed energy. The T/R sub-assembly is designed to be withdrawn from a panel. This decision restricts the connectors to an elongated narrow surface at the back of the T/R sub-assembly. The power is preferrably centralized in a minimum number of pins in a single multiple pin conductor (39). Adding more than four T/R modules would tend to lengthen the vertical paths for the power connections, increase the serial inductance and reduce the power supply efficiency. This constraint also tends to favor no more than four T/R modules per T/R sub-assembly.

What is claimed is:

1. A combination for maintaining an accurate phase response in the transmit path from the exciter to each antenna element and in the receive path from each antenna element to the receiver in an m×n element phased array radar apparatus, comprising:

A. an exciter providing a signal for calibration and transmission,

B. a receiver including a calibration phase error sensing circuit having a reference port coupled to said exciter and a measurement port, C. beamforming means providing m×n/j plural ports where j is a small integer including 1, disposed in the transmit/receive operating paths from exciter/receiver to antenna elements, said beamformer means having a singular port internally coupled to plural ports, said singular port leading to exciter/receiver, and each of said plural ports leading to a subset j of antenna elements, said beamforming means further including means for separating signals proceeding from the exciter to the antenna elements from signals proceeding from the antenna elements to the receiver, the respective transmit and receive operating paths being coincident at the beamformer plural ports, D. a corporate calibration feed network providing a singular port internally coupled to (m×n/i) plural ports where i is a small integer not including 1, a power of 2 and greater than or equal to j, each path being of known electrical length to provide a calibrating path from each antenna element to the exciter/receiver, E. an (m×n/i) fold plurality of phase adjustable transmit/receive sub-assemblies, each disposed in the transmit/receive operating paths for each subset of i antenna elements, each sub-assembly comprising (1) a stripline to microstrip divider network and transition having j stripline ports, each connected to a plural beamformer port, and i microstrip ports, (2) i transmit/receive modules using microstrip transmission paths, each module containing the active electronics for processing the signals of one associated antenna element, each module having:

(i) a bidirectional controllable phase shifter disposed in a transmit/receive operating path connected to one microstrip port of said divider network and transition having a control for setting the phase, (ii) a power amplifier disposed in the transmit operating path for amplifying the exciter signal, (iii) a low noise amplifier disposed in the receive operating path for amplifying signals from the associated antenna element, (iv) a pair of three port transmit/receive branching means for coupling signals from the exciter via the phase shifter, via the power amplifier to an associated antenna element during transmission and for coupling signals from the antenna via the low noise amplifier, via the phase shifter, to the receiver during reception, the transmit/receive port of the first branching means being coupled to said phase shifter, (3) i microstrip to stripline transitions coupled to the transmit/receive ports of said second branching means, (4) a stripline antenna circuit coupled said i stripline transitions comprising:

(i) i linearly aligned adjacent antenna elements, (ii) i directional calibration couplers disposed between said transitions and said antenna elements, each having an antenna port coupled to an antenna element, a transmit/receive port coupled to the stripline port of one transition and a calibration port; signals received by said antenna being internally coupled to said transmit/receive port, signals coupled to said transmit/receive port being internally coupled to said antenna port and said calibration port, and signals coupled to said calibration port being internally coupled to said transmit/receive port, and (iii) a corporate feed network having a singular port for connection to a calibration network internally coupled to i plural ports through paths of substantially equal electrical length, each plural port being connected to the calibration port of each calibration coupler for serially connecting each transmit/receive operating path with a path in said calibration network to facilitate transmit/receive operating path calibration, and F. means for switching the exciter output for transmit operating path measurement into a loop consisting initially of the transmit operating path, secondly of a calibrating path, and finally returning to the receiver measurement port and for switching the exciter output for receive operating path measurement into a loop consisting initially of a calibrating path, secondly of a receive operating path, and finally returning to the receiver measurement port.

2. The combination set forth in claim 1 wherein the bi-directional phase shifter in each T/R module has digital phase states, subject to logical control.

3. The combination set forth in claim 1 wherein the power amplifier in each T/R module has digital power states, subject to logical control.

4. The combination set forth in claim 1 wherein the low noise amplifier in each T/R module has digital gain states, subject to logical control.

5. The combination set forth in claim 2, having in addition thereto control logic for generating equipment state and beam steering commands for setting the phase states of the phase shifters during transmit and receive operating states, said control logic including a memory for storing phase error data obtained during calibration reflecting phase errors in each transmit operating path and each receive operating path, and means to adjust the settings of said phase shifters by said stored phase error data to remove said phase errors, thereby reducing undesired variations in the phases of said operating paths.

6. The combination set forth in claim 5 wherein the power amplifiers in each T/R module have digital power states, subject to logical control, the low noise amplifiers in each T/R module have digital gain states, subject to logical control, and said control logic generates equipment state and beam steering commands for setting the power states of said power amplifiers during the transmit operating state and the gain states of said low noise amplifiers during the receive operating state.

7. The combination set forth in claim 6 wherein said control logic includes a memory for storing power and gain error data obtained by calibration, and means to adjust the settings of said power amplifiers and said low noise amplifiers by said stored error data to remove the power and gain errors, thereby reducing undesired variations in the power in said transmit operating paths and in the gain in said receive operating paths.

8. The combination set forth in claim 7 wherein said memory for storing power and gain error data obtained by calibration is a read only memory (ROM) written during calibration, and wherein said control logic includes
means to monitor the settings of said power amplifiers and said low noise amplifiers to determine when said power and gain performance deviate significantly from the desired values, so as to require removal and replacement.

9. The combination set forth in claim 1, wherein said stripline to microstrip divider network and transition and said i microstrip to stripline transitions are disconnectable to allow removal of its T/R modules from the T/R sub-assembly to facilitate replacement without change in electrical performance.

10. The combination set forth in claim 9, wherein said quantity i is four, and
said quantity j is one, two or four.

11. A phase adjustable T/R sub-assembly for a set of i antenna elements where i is a small integer not including 1 and a power of 2, said T/R sub-assembly being adapted for use with a plurality of similar T/R sub-assemblies in a self-calibrating phased array radar apparatus having m×n antenna elements and including a calibration network providing a calibration path for each set of i antenna elements, said T/R sub-assembly comprising:
(1) j stripline signal input ports, where j is a small integer including 1, less than or equal to i,
(2) a stripline to microstrip divider network and transition having j stripline ports, each connected to a signal input port and i microstrip ports,
(3) i transmit/receive modules using microstrip transmission paths, each module containing the active electronics for processing the signals of one associated antenna element,
each module having:
(i) a bidirectional controllable phase shifter disposed in a transmit/receive operating path connected to one microstrip port of said divider network and transition having a control for setting the phase,
(ii) a power amplifier disposed in the transmit operating path for amplifying the exciter signal,
(iii) a low noise amplifier disposed in the receive operating path for amplifying signals from the associated antenna element,
(iv) a pair of three port transmit/receive branching means, the first branching means having a transmit/receive port coupled to said phase shifter for coupling signals from said phase shifter via the power amplifier to an associated antenna element during transmission and the second branching means having a transmit/receive port for coupling signals from the antenna via the low noise amplifier to said phase shifter during reception,
(4) i microstrip to stripline transitions coupled to the transmit/receive ports of said second branching means,
(5) a stripline antenna circuit comprising:
(i) i linearly aligned adjacent antenna elements,
(ii) i directional calibration couplers disposed between said transitions and said antenna elements, each having an antenna port coupled to an antenna element, a transmit/receive port coupled to the stripline port of one transition and a calibration port; signals received by said antenna being internally coupled to said transmit/receive port, signals coupled to said transmit/receive port being internally coupled to said antenna port and said calibration port, and signals coupled to said calibration port being internally coupled to said transmit/receive port, and
(iii) a corporate feed network having a singular port for connection to a calibration network internally coupled to i plural ports through paths of equal electrical length, each plural port being connected to the calibration port of each calibration coupler for serially connecting each transmit/receive operating path with a path in said calibration network to facilitate transmit/receive operating path calibration.

12. The phase adjustable T/R sub-assembly set forth in claim 11 wherein
said bi-directional phase shifter in each T/R module has digital phase states, subject to logical control.

13. The phase adjustable T/R sub-assembly set forth in claim 11 wherein
said power amplifier in each T/R module has digital power states, subject to logical control.

14. The phase adjustable T/R sub-assembly set forth in claim 11 wherein
said low noise amplifier in each T/R module has digital gain states,-subject to logical control.

15. The phase adjustable T/R sub-assembly set forth in claim 12, having in addition thereto
a connector for providing equipment state, and beam steering commands to said T/R sub-assembly, and
control logic responsive to equipment state and beam steering commands for setting the phase states of said i phase shifters during transmit and receive operating states.

16. The phase adjustable T/R sub-assembly set forth in claim 15 wherein
said i power amplifiers in each T/R module have digital power states, subject to logical control,
said i low noise amplifiers in each T/R module have digital gain states, subject to logical control, and
said control logic is responsive to equipment state data and beam steering commands for setting the power states of said i power amplifiers during the transmit operating state and the gain states of said i low noise amplifiers during the receive operating state.

17. The phase adjustable T/R sub-assembly set forth in claim 16 wherein said control logic includes
a memory for storing error data obtained by calibration, and
means to adjust the response to said commands by said stored error data to remove the errors, thereby reducing undesired variations between modules.

18. The phase adjustable T/R sub-assembly set forth in claim 11, wherein
said stripline to microstrip divider network and transition and said i microstrip to stripline transitions are disconnectable to allow removal of a T/R module from said T/R sub-assembly and its replacement without change in electrical performance.

19. The phase adjustable T/R sub-assembly set forth in claim 18, wherein
said quantity i is four, and
said quantity j is one, two or four.

20. The phase adjustable T/R sub-assembly for use in radar apparatus at frequencies above about 3 Gigahertz set forth in claim 18, wherein
said T/R sub-assembly is dimensioned to be installed in rows and columns with similar T/R sub-assemblies in the frame for the antenna aperture of a radar apparatus, the front of said T/R sub-assembly being designed to be exposed, and the rear designed to be positioned within said frame,
the front of said T/R sub-assembly being elongated to accommodate a row of i exposed antenna elements and the cross section behind said front being thin to permit air circulation between adjacent T/R sub-assemblies while maintaining the required spacing between the antenna elements, and
the connections to said T/R sub-assembly being provided at the rear to permit connection by insertion of said T/R sub-assembly within said frame.

21. The phase adjustable T/R sub-assembly set forth in claim 20 wherein
said stripline to microstrip divider network and transition, said i transmit/receive modules; and said stripline circuit are arranged in the order recited from front to back within said T/R sub-assembly.

22. The phase adjustable T/R sub-assembly set forth in claim 20 wherein
said phase shifter, power amplifier, and low noise amplifier, employ active and passive circuit elements of a Gallium Arsenide construction.

23. A combination for calibration of the transmit path from the exciter to each antenna element and of the receive path from each antenna element to the receiver in an m×n element phased array radar apparatus, comprising:
A. an exciter providing a signal for calibration and transmission,
B. a receiver including a calibration error sensing circuit having a reference port coupled to said exciter and a measurement port,
C. beamforming means providing m×n/j plural ports where j is a small integer including 1, disposed in the transmit/receive operating paths from exciter/receiver to antenna elements, said beamformer means having a singular port internally coupled to plural ports, said singular port leading to exciter/receiver, and each of said plural ports leading to a subset j of antenna elements, said beamforming means further including means for separating signals proceeding from the exciter to the antenna elements from signals proceeding from the antenna elements to the receiver, the respective transmit and receive operating paths being coincident at the beamformer plural ports,
D. a corporate calibration feed network providing a singular port internally coupled to (m×n/i) plural ports where i is a small integer, each path being of known electrical length to provide a calibrating path for each antenna element to the exciter/receiver,
E. an (m×n/i) fold plurality of transmit/receive sub-assemblies, each disposed in the transmit/receive operating paths for each subset of i antenna elements, each sub-assembly comprising
(1) i transmit/receive module(s), each module containing the active electronics for processing the signals of one associated antenna element,
each module having:
(i) a bidirectional phase shifter disposed in a transmit/receive operating path,
(ii) a power amplifier disposed in the transmit operating path for amplifying the exciter signal,
(iii) a low noise amplifier disposed in the receive operating path for amplifying signals from the associated antenna element,
(iv) a pair of three port transmit/receive branching means for coupling signals from the exciter via the phase shifter, via the power amplifier to an associated antenna element during transmission and for coupling signals from the antenna via the low noise amplifier via the phase shifter to the receiver during reception, the transmit/receive port of the first branching means being coupled to said phase shifter,
(2) an antenna circuit coupled to the transmit/receive ports of said second branching means comprising:
(i) i linearly aligned adjacent antenna element(s),
(ii) i directional calibration coupler(s) disposed between said transitions and said antenna elements, each having an antenna port coupled to an antenna element, a transmit/receive port coupled to the stripline port of one transition and a calibration port; signals received by said antenna being internally coupled to said transmit/receive port, signals coupled to said transmit/receive port being internally coupled to said antenna port and said calibration port, and signals coupled to said calibration port being internally coupled to said transmit/receive port, and
(iii) a network having a singular port for connection to a calibration network internally coupled to a set of i port(s) through paths of substantially equal electrical length, each of said i set of ports being connected to the calibration port of each calibration coupler for serially connecting each transmit/receive operating path with a path in said calibration network to facilitate transmit/receive operating path calibration, and
F. means for selectively switching the exciter output for transmit operating path measurement into a loop consisting initially of the transmit operating path, secondly of a calibrating path, and finally returning to the receiver measurement port and for switching the exciter output for receive operating path measurement into a loop consisting initially of a calibrating path, secondly of a receive operating path, and finally returning to the receiver measurement port.

24. The combination set forth in claim 23 wherein
the quantity j is 1, 2 or 4, and
the quantity i is 4.

* * * * *